US009664832B2

(12) United States Patent
Banerjee

(10) Patent No.: US 9,664,832 B2
(45) Date of Patent: May 30, 2017

(54) OMNIDIRECTIONAL HIGH CHROMA RED STRUCTURAL COLOR WITH COMBINATION SEMICONDUCTOR ABSORBER AND DIELECTRIC ABSORBER LAYERS

(71) Applicant: Toyota Motor Engineering & Manufacturing North America, Inc., Erlanger, KY (US)

(72) Inventor: Debasish Banerjee, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 28 days.

(21) Appl. No.: 14/793,123

(22) Filed: Jul. 7, 2015

(65) Prior Publication Data
US 2015/0309231 A1   Oct. 29, 2015

Related U.S. Application Data

(63) Continuation-in-part of application No. 14/607,933, filed on Jan. 28, 2015, which is a continuation-in-part
(Continued)

(51) Int. Cl.
*G02B 1/10* (2015.01)
*G02B 5/28* (2006.01)
(Continued)

(52) U.S. Cl.
CPC ............. *G02B 5/286* (2013.01); *G02B 1/10* (2013.01); *G02B 5/0825* (2013.01); *G02B 5/0858* (2013.01); *G02B 5/207* (2013.01)

(58) Field of Classification Search
CPC ...... G02B 1/105; G02B 1/115; G02B 27/142; G02B 5/285; G02B 5/0825; G02B 5/26;
(Continued)

(56) References Cited

U.S. PATENT DOCUMENTS 3,247,392 A   4/1966   Thelen
3,650,790 A   3/1972   Klenke et al.
(Continued)

FOREIGN PATENT DOCUMENTS

CN   1527100 A   9/2004
CN   1741246 A   3/2006
(Continued)

OTHER PUBLICATIONS

Sajeev John et al., "Photonic Band Gap Materials: A Semiconductor for Light", Department of Physics, University of Toronto, p. 1-23; 2001.
(Continued)

*Primary Examiner* — Euncha Cherry
(74) *Attorney, Agent, or Firm* — Dinsmore & Shohl LLP

(57) ABSTRACT

A high-chroma omnidirectional red structural color pigment. The omnidirectional structural color pigment is in the form of a multilayer stack that has a reflective core layer, a semiconductor absorber layer extending across the reflective core layer, a dielectric absorber layer extending across the semiconductor absorber layer and a high index of refraction dielectric layer extending across the dielectric absorber layer. The multilayer stack reflects a single band of visible light with a hue between 0-40°, and preferably between 10-30°, on an a*b* Lab color map. The single band of visible light has a hue shift of less than 30° on the a*b* Lab color map when viewed from all angles between 0-45° normal to an outer surface of the multilayer stack.

19 Claims, 11 Drawing Sheets

Related U.S. Application Data of application No. 14/471,834, filed on Aug. 28, 2014, which is a continuation-in-part of application No. 14/460,511, filed on Aug. 15, 2014, which is a continuation-in-part of application No. 14/242,429, filed on Apr. 1, 2014, which is a continuation-in-part of application No. 14/138,499, filed on Dec. 23, 2013, which is a continuation-in-part of application No. 13/913,402, filed on Jun. 8, 2013, which is a continuation-in-part of application No. 13/760,699, filed on Feb. 6, 2013, which is a continuation-in-part of application No. 13/572,071, filed on Aug. 10, 2012.

(51) Int. Cl.
*G02B 5/20* (2006.01)
*G02B 5/08* (2006.01)

(58) Field of Classification Search
CPC ...... G02B 5/0858; G02B 5/22; G02B 5/3041; G02B 5/286; B32B 9/00; B32B 7/02; C09C 1/0015
USPC ......... 359/577–590; 428/620, 621, 622, 623, 428/641; 106/404, 415
See application file for complete search history.

(56) References Cited

U.S. PATENT DOCUMENTS

| | | |
|---|---|---|
| 3,769,515 A | 10/1973 | Clark, Jr. |
| 3,885,408 A | 5/1975 | Clark, Jr. |
| 3,910,681 A | 10/1975 | Elliott et al. |
| 3,953,643 A | 4/1976 | Cheung et al. |
| 4,079,605 A | 3/1978 | Bartels |
| 4,449,126 A | 5/1984 | Pekker |
| 4,525,028 A | 6/1985 | Dorschner |
| 4,544,415 A | 10/1985 | Franz et al. |
| 4,556,599 A | 12/1985 | Sato et al. |
| 4,613,622 A | 9/1986 | Moeller et al. |
| 4,643,518 A | 2/1987 | Taniguchi |
| 4,673,914 A | 6/1987 | Lee |
| 4,705,839 A | 11/1987 | Martin |
| 4,714,308 A | 12/1987 | Sawamura et al. |
| 4,753,829 A | 6/1988 | Panush |
| 4,756,602 A | 7/1988 | Southwell et al. |
| 4,868,559 A | 9/1989 | Pinnow |
| 4,896,928 A | 1/1990 | Perilloux et al. |
| 5,007,710 A | 4/1991 | Nakajima et al. |
| 5,043,593 A | 8/1991 | Tsutsumi et al. |
| RE33,729 E | 10/1991 | Perilloux |
| 5,132,661 A | 7/1992 | Pinnow |
| 5,138,468 A | 8/1992 | Barbanell |
| 5,214,530 A | 5/1993 | Coombs et al. |
| 5,245,329 A | 9/1993 | Gokcebay |
| 5,279,657 A | 1/1994 | Phillips et al. |
| 5,283,431 A | 2/1994 | Rhine |
| 5,323,416 A | 6/1994 | Bhat et al. |
| 5,423,912 A | 6/1995 | Sullivan et al. |
| 5,424,119 A | 6/1995 | Phillips et al. |
| 5,437,931 A | 8/1995 | Tsai et al. |
| 5,472,798 A | 12/1995 | Kumazawa et al. |
| 5,491,470 A | 2/1996 | Veligdan |
| 5,543,665 A | 8/1996 | Demarco |
| 5,561,420 A | 10/1996 | Kleefeldt et al. |
| 5,569,332 A | 10/1996 | Glatfelter et al. |
| 5,569,353 A | 10/1996 | Zodrow |
| 5,569,535 A | 10/1996 | Phillips et al. |
| 5,570,847 A | 11/1996 | Phillips et al. |
| 5,571,624 A | 11/1996 | Phillips et al. |
| 5,653,792 A | 8/1997 | Phillips et al. |
| 5,691,844 A | 11/1997 | Oguchi et al. |
| 5,700,550 A | 12/1997 | Uyama et al. |
| 5,759,255 A | 6/1998 | Venturini et al. |
| 5,768,026 A | 6/1998 | Kiyomoto et al. |
| 5,850,309 A | 12/1998 | Shirai et al. |
| 5,889,603 A | 3/1999 | Roddy et al. |
| 5,982,078 A | 11/1999 | Krisl et al. |
| 6,049,419 A | 4/2000 | Wheatley et al. |
| 6,055,079 A | 4/2000 | Hagans et al. |
| 6,130,780 A | 10/2000 | Joannopoulos et al. |
| 6,150,022 A | 11/2000 | Coulter et al. |
| 6,156,115 A | 12/2000 | Pfaff et al. |
| 6,157,480 A | 12/2000 | Anderson et al. |
| 6,157,489 A | 12/2000 | Bradley, Jr. et al. |
| 6,157,498 A | 12/2000 | Takahashi |
| 6,180,025 B1 | 1/2001 | Schoenfeld et al. |
| 6,215,592 B1 | 4/2001 | Pelekhaty |
| 6,242,056 B1 | 6/2001 | Spencer et al. |
| 6,243,204 B1 * | 6/2001 | Bradley, Jr. ........... C09C 1/0015 106/415 |
| 6,249,378 B1 | 6/2001 | Shimamura et al. |
| 6,310,905 B1 | 10/2001 | Shirai |
| 6,331,914 B1 | 12/2001 | Wood, II et al. |
| 6,383,638 B1 | 5/2002 | Coulter et al. |
| 6,387,457 B1 | 5/2002 | Jiang et al. |
| 6,387,498 B1 | 5/2002 | Coulter et al. |
| 6,399,228 B1 | 6/2002 | Simpson |
| 6,433,931 B1 | 8/2002 | Fink et al. |
| 6,451,414 B1 | 9/2002 | Wheatley et al. |
| 6,475,273 B1 | 11/2002 | Zimmermann et al. |
| 6,534,903 B1 | 3/2003 | Spiro et al. |
| 6,565,770 B1 | 5/2003 | Mayer et al. |
| 6,569,527 B1 | 5/2003 | Calhoun et al. |
| 6,574,383 B1 | 6/2003 | Erchak et al. |
| 6,596,070 B1 | 7/2003 | Schmidt et al. |
| 6,618,149 B1 | 9/2003 | Stirton |
| 6,624,945 B2 | 9/2003 | Fan et al. |
| 6,667,095 B2 | 12/2003 | Wheatley et al. |
| 6,686,042 B1 * | 2/2004 | LeGallee ................ B32B 7/02 106/404 |
| 6,753,952 B1 | 6/2004 | Lawrence et al. |
| 6,844,976 B1 | 1/2005 | Firon et al. |
| 6,873,393 B2 | 3/2005 | Ma |
| 6,887,526 B1 | 5/2005 | Arlt et al. |
| 6,894,838 B2 | 5/2005 | Mizrahi et al. |
| 6,903,873 B1 | 6/2005 | Joannopoulos et al. |
| 6,913,793 B2 | 7/2005 | Jiang et al. |
| 6,927,900 B2 | 8/2005 | Liu et al. |
| 6,997,981 B1 | 2/2006 | Coombs et al. |
| 7,052,762 B2 | 5/2006 | Hebrink et al. |
| 7,064,897 B2 | 6/2006 | Hebrink et al. |
| 7,098,257 B2 | 8/2006 | Rink et al. |
| 7,106,516 B2 | 9/2006 | Lotz et al. |
| 7,123,416 B1 | 10/2006 | Erdogan et al. |
| 7,141,297 B2 | 11/2006 | Condo et al. |
| 7,184,133 B2 | 2/2007 | Coombs et al. |
| 7,190,524 B2 | 3/2007 | Grawert et al. |
| 7,215,473 B2 | 5/2007 | Fleming |
| 7,236,296 B2 | 6/2007 | Liu et al. |
| 7,267,386 B2 | 9/2007 | Hesch |
| 7,326,967 B2 | 2/2008 | Hsieh et al. |
| 7,329,967 B2 | 2/2008 | Nozawa et al. |
| 7,352,118 B2 | 4/2008 | Chowdhury et al. |
| 7,367,691 B2 | 5/2008 | Lin |
| 7,410,685 B2 | 8/2008 | Rosenberger et al. |
| 7,413,599 B2 | 8/2008 | Henglein et al. |
| 7,446,142 B2 | 11/2008 | Meisenburg et al. |
| 7,452,597 B2 | 11/2008 | Bujard |
| 7,483,212 B2 | 1/2009 | Cho et al. |
| 7,638,184 B2 | 12/2009 | Yaoita et al. |
| 7,667,895 B2 | 2/2010 | Argoitia et al. |
| 7,699,350 B2 | 4/2010 | Heim |
| 7,699,927 B2 | 4/2010 | Henglein et al. |
| 7,745,312 B2 | 6/2010 | Herner et al. |
| 7,847,342 B2 | 12/2010 | Fukuzumi et al. |
| 7,851,580 B2 | 12/2010 | Li et al. |
| 7,859,754 B2 | 12/2010 | Falicoff |
| 7,863,672 B2 | 1/2011 | Jin et al. |
| 7,903,339 B2 | 3/2011 | Banerjee et al. |
| 7,929,730 B2 | 4/2011 | Huang et al. |
| 7,980,711 B2 | 7/2011 | Takayanagi et al. |
| 8,013,383 B2 | 9/2011 | Kidoh et al. |
| 8,257,784 B2 | 9/2012 | Grayson et al. |

(56) References Cited

U.S. PATENT DOCUMENTS

| | | |
|---|---|---|
| 8,313,798 B2 | 11/2012 | Nogueira et al. |
| 8,323,391 B2 | 12/2012 | Banerjee et al. |
| 8,329,247 B2 | 12/2012 | Banerjee et al. |
| 8,350,314 B2 | 1/2013 | Fukuzumi et al. |
| 8,440,014 B2 | 5/2013 | Kitamura et al. |
| 8,446,666 B2 | 5/2013 | Kurt et al. |
| 8,593,728 B2 | 11/2013 | Banerjee et al. |
| 8,599,464 B2 | 12/2013 | Park |
| 8,619,365 B2 | 12/2013 | Harris et al. |
| 8,736,959 B2 | 5/2014 | Grayson et al. |
| 9,063,291 B2 | 6/2015 | Banerjee et al. |
| 2001/0022151 A1 | 9/2001 | Sliwinski et al. |
| 2002/0030882 A1 | 3/2002 | Vitt et al. |
| 2002/0096087 A1 | 7/2002 | Glausch |
| 2002/0117080 A1 | 8/2002 | Okutsu et al. |
| 2002/0129739 A1 | 9/2002 | Yanagimoto et al. |
| 2003/0002157 A1 | 1/2003 | Someno |
| 2003/0059549 A1 | 3/2003 | Morrow et al. |
| 2004/0047055 A1 | 3/2004 | Mizrahi et al. |
| 2004/0156984 A1 | 8/2004 | Vitt et al. |
| 2004/0179267 A1 | 9/2004 | Moon et al. |
| 2004/0191540 A1 | 9/2004 | Jakobi et al. |
| 2004/0246477 A1 | 12/2004 | Moon et al. |
| 2004/0252509 A1 | 12/2004 | Lin |
| 2004/0263983 A1 | 12/2004 | Acree |
| 2004/0265477 A1 | 12/2004 | Nabatova-Gabain et al. |
| 2005/0126441 A1 | 6/2005 | Skelhorn |
| 2005/0132929 A1 | 6/2005 | Raksha et al. |
| 2005/0152417 A1 | 7/2005 | Lin |
| 2005/0235714 A1 | 10/2005 | Lindstrom |
| 2005/0264874 A1 | 12/2005 | Lin |
| 2006/0006402 A1 | 1/2006 | Hsieh et al. |
| 2006/0030656 A1 | 2/2006 | Tarng et al. |
| 2006/0081858 A1 | 4/2006 | Lin et al. |
| 2006/0145172 A1 | 7/2006 | Su et al. |
| 2006/0155007 A1 | 7/2006 | Huber |
| 2006/0159922 A1 | 7/2006 | O'Keefe |
| 2006/0222592 A1 | 10/2006 | Burda |
| 2007/0097509 A1 | 5/2007 | Nevitt et al. |
| 2007/0221097 A1 | 9/2007 | Tarng et al. |
| 2009/0046368 A1 | 2/2009 | Banerjee et al. |
| 2009/0082659 A1 | 3/2009 | Ham et al. |
| 2009/0153953 A1 | 6/2009 | Banerjee et al. |
| 2009/0161220 A1 | 6/2009 | Banerjee et al. |
| 2009/0241802 A1 | 10/2009 | Nemoto et al. |
| 2009/0303044 A1 | 12/2009 | Furuichi et al. |
| 2009/0321693 A1 | 12/2009 | Ohkuma et al. |
| 2010/0064938 A1 | 3/2010 | Voit et al. |
| 2010/0208338 A1 | 8/2010 | Banerjee et al. |
| 2010/0209593 A1 | 8/2010 | Banerjee et al. |
| 2010/0213485 A1 | 8/2010 | McKenzie et al. |
| 2011/0091658 A1 | 4/2011 | Banerjee et al. |
| 2011/0113984 A1 | 5/2011 | Fuller, Jr. et al. |
| 2011/0128616 A1 | 6/2011 | Banerjee et al. |
| 2011/0134515 A1 | 6/2011 | Banerjee et al. |
| 2011/0228399 A1 | 9/2011 | Ohnishi |
| 2011/0299154 A1 | 12/2011 | Grayson et al. |
| 2012/0050848 A1 | 3/2012 | Carlson et al. |
| 2012/0107584 A1 | 5/2012 | Eibon et al. |
| 2012/0307369 A1 | 12/2012 | Banerjee et al. |
| 2013/0148221 A1 | 6/2013 | Banerjee et al. |
| 2013/0213260 A1 | 8/2013 | Kunii |
| 2013/0250403 A1 | 9/2013 | Maeda |
| 2013/0265668 A1 | 10/2013 | Banerjee et al. |
| 2014/0018439 A1 | 1/2014 | Gruner et al. |
| 2014/0111861 A1 | 4/2014 | Banerjee et al. |
| 2014/0211303 A1 | 7/2014 | Banerjee et al. |
| 2014/0368918 A1 | 12/2014 | Banerjee et al. |

FOREIGN PATENT DOCUMENTS

| | | |
|---|---|---|
| DE | 2106613 A1 | 8/1971 |
| EP | 141143 B1 | 5/1985 |
| JP | 07034324 | 2/1995 |
| JP | 2000220331 A | 8/2000 |
| JP | 2000329933 A | 11/2000 |
| JP | 2005144925 A | 6/2005 |
| JP | 2006506518 A | 2/2006 |
| JP | 2006097426 A | 4/2006 |
| JP | 2008038382 A | 2/2008 |
| WO | 99/42892 A1 | 8/1999 |
| WO | 00/22466 A1 | 4/2000 |
| WO | 0031571 A1 | 6/2000 |
| WO | 02054030 A2 | 7/2002 |
| WO | 03062871 A1 | 7/2003 |

OTHER PUBLICATIONS

Distributed Bragg Reflector; en.wikipedia.org/wiki/Distributed_Bragg_reflector (2005).

Photonic Crystal; en.wikipedia.org/wiki/Photonic_crystal (2003).

Tikhonravov, et al., "Application of the Needle Optimization Technique to the Design of Optical Coatings", Applied Optics, Optical Society of America, 1996, pp. 5493-5508, vol. 35, No. 28.

Deopura, M. et al., "Dielectric Omnidirectional Visible Reflector." Optical Society of America; vol. 26, No. 15; Department of Material Science and Engineering, Massachusetts Institute of Technology; pp. 1197-1199; Aug. 1, 2001.

Bing-Xin Wei et al., "Detrimental Thixotropic Thinning of Filter Cake of SiO2-Al2O3 Composite Coated TiO2 Particles and Its Control", Industrial & Engineering Chemistry Research, Sep. 27, 2011, 50, pp. 13799-13804.

Tikhonravov, Alexander V. et al., "Optical Coating Design Algorithm Based on the Equivalent Layers Theory", Applied Optics: vol. 45, No. 7; Mar. 2006; pp. 1530-1538.

Kaminska, Kate et al., "Birefringent Omnidirectional Reflector", Applied Optics, vol. 43, No. 7, Mar. 2004, pp. 1570-1576.

Hongqiang et al, "Disordered dielectric high reflectors with broadband from visible to infrared," Applied Physics Letters, American Institute of Physics, Melville, NY, US, vol. 74, No. 22, 1999.

Xifre-Perez et al, "Porous silicon mirrors with enlarged omnidirectional band gap," Journal of Applied Physics, American Institute of Physics, Melville, NY, US, vol. 97, No. 6, dated Mar. 9, 2005.

"Laser 2000 Gmbttp://www.laser2000.de/fileadmin/Produkdaten/SK_WEB/Datenblaetter_SEM/SEMROCK-StopLine-Notchfilter.pdf, accessed Feb. 2, 2010".

Bendiganavale A.K., Malshe, V.C., "Infrared Reflective Inorganic Pigments", Recent Patents on Chemical Engineering, 2008, 1, 67-79.

D.P. Young, Jr., et al. "Comparison of Avian Responses to UV-Light Reflective Paint on Wind Turbines," National Renewable Energy Laboratory, Subcontract Report, Jan. 2003.

Maier, E.J. "To Deal With the Invisible: On the biological significance of ultraviolet sensitivity in birds." Naturwissenschaften 80: 476-478, 1993.

Nixon, J., "Twinkle, Twinkle, Little Star," Asia Pacific Coatings Journal, Feb. 2004.

Fink, Yoel et al., "A Dielectric Omnidirectional Reflector", Science, vol. 282, Nov. 27, 1998.

Lin, Weihua et al., "Design and Fabrication of Omnidirectional Reflectors in the Visible Range", Journal of Modern Optics, vol. 52, No. 8, 1155 (2005).

Chen, Kevin M. et al., "Si02/Ti02 Omnidirectional Reflector and Microcavity Resonator Via the Sol-Gel Method", Appl. Phys. Lett., vol. 75, No. 24, Dec. 13, 1999.

Almeida, R.M. et al., "Photonic Bandgap Materials and Structures by Sol-Gel Processing", Journal of Non-Crystalline Solids, 405-409 (2003).

Decorby, R.G., et al., "Planar Omnidirectional Reflectors in Chalcogenide Glass and Polymer" Optics Express, 6228, Aug. 8, 2005.

Clement, T.J. et al., "Improved Omnidirectional Reflectors in Chalcogenide Glass and Polymer by Using the Silver Doping Technique", Optics Express, 14, 1789 (2006).

Bruyant, A. et al., "All-Silicon Omnidirectional Mirrors Based on One-Dimensional Photonic Crystals", Appl. Phys. Lett. vol. 82, No. 19, May 12, 2003.

(56) References Cited

OTHER PUBLICATIONS

Chigrin, D.N. et al., "Observation of Total Omnidirectional Reflection From a One-Dimensional Dielectric Lattice", Appl. Phys. A. 68, 25-28 (1999).
Park, Y. et al., "GaAs-based Near-infrared Omnidirectional Reflector", Appl. Phys. Lett., vol. 82, No. 17, Apr. 28, 2003.
Lee, H.Y. et al., "Design and Evaluation of Omnidirectional One-Dimensional Photonic Crystals", Journal of Appl. Phys. vol. 93, No. 2, Jan. 15, 2003.
Banerjee, D. et al., "Narrow-band Omnidirectional Structural Color", SAE World Congress 01-1049 (2008).

* cited by examiner

OMNIDIRECTIONAL HIGH CHROMA RED STRUCTURAL COLOR WITH COMBINATION SEMICONDUCTOR ABSORBER AND DIELECTRIC ABSORBER LAYERS

CROSS REFERENCE TO RELATED APPLICATIONS

The instant application is a continuation-in-part (CIP) of U.S. patent application Ser. No. 14/607,933 filed on Jan. 28, 2015, which in is a CIP of U.S. patent application Ser. No. 14/471,834 filed on Aug. 28, 2014, which in turn is a CIP of U.S. patent application Ser. No. 14/460,511 filed on Aug. 15, 2014, which in turn is a CIP of U.S. patent application Ser. No. 14/242,429 filed on Apr. 1, 2014, which in turn is a CIP of U.S. patent application Ser. No. 14/138,499 filed on Dec. 23, 2013, which in turn is a CIP of U.S. patent application Ser. No. 13/913,402 filed on Jun. 8, 2013, which in turn is a CIP of U.S. patent application Ser. No. 13/760,699 filed on Feb. 6, 2013, which in turn is a CIP of Ser. No. 13/572,071 filed on Aug. 10, 2012, all of which are incorporated in their entirety by reference.

FIELD OF THE INVENTION

The present invention is related to multilayer stack structures that exhibit a high chroma red color with a minimum or non-noticeable color shift when exposed to broadband electromagnetic radiation and viewed from different angles.

BACKGROUND OF THE INVENTION

Pigments made from multilayer structures are known. In addition, pigments that exhibit or provide a high-chroma omnidirectional structural color are also known. However, such prior art pigments have required as many as 39 thin film layers in order to obtain desired color properties.

It is appreciated that cost associated with the production of thin film multilayer pigments is proportional to the number of layers required. As such, the cost associated with the production of high-chroma omnidirectional structural colors using multilayer stacks of dielectric materials can be prohibitive. Therefore, a high-chroma omnidirectional structural color that requires a minimum number of thin film layers would be desirable.

In addition to the above, it is appreciated that the design of pigments with a red color face an additional hurdle to pigments of other colors such as blue, green, etc. In particular, the control of angular independence for red color is difficult since thicker dielectric layers are required, which in turn results in a high harmonic design, i.e. the presence of the second and possible third harmonics is inevitable. Also, the dark red color hue space is very narrow. As such, a red color multilayer stack has a higher angular variance.

Given the above, a high-chroma red omnidirectional structural color pigment with a minimum number of layers would be desirable.

SUMMARY OF THE INVENTION

An omnidirectional high-chroma red structural color pigment is provided. The omnidirectional structural color pigment is in the form of a multilayer stack that has a reflective core layer, a semiconductor absorber layer extending across the reflective core layer, a dielectric absorber layer extending across the semiconductor absorber layer, and a high index of refraction dielectric layer extending across the dielectric absorber layer. The multilayer stack reflects a single band of visible light with a hue between 0-40°, and preferably between 10-30°, on an a*b* Lab color map. In addition, the single band of visible light has a hue shift of less than 30° on the a*b* Lab color map when viewed from all angles between 0-45° normal to an outer surface of the multilayer stack and as such provides a non-noticeable color shift to the human eye.

The reflective core layer has a thickness between 50-200 nanometers (nm), inclusive, and can be made from a reflective metal such as aluminum (Al), silver (Ag), platinum (Pt), tin (Sn), combinations thereof, and the like. The reflective core layer can also be made from a colorful metal such as gold (Au), copper (Cu), brass, bronze, and the like.

The semiconductor absorber layer can have a thickness between 5-500 nm, inclusive, and be made from such materials such as amorphous silicon (Si), germanium (Ge), and combinations thereof. The dielectric absorber layer can have a thickness between 5-500 nm, inclusive, and be made from materials such as but not limited to iron oxide ($Fe_2O_3$), . . . .

The thickness of the high index of refraction dielectric layer is greater than 0.1 quarter wave thickness (QW) and less than or equal to 4 QW for a target wavelength, the target wavelength having a predefined hue within the 0-40°, and preferably between 10-30°, on the a*b* Lab color map. The high index of refraction dielectric layer can be made from a dielectric material such as zinc sulfide (ZnS), titanium dioxide ($TiO_2$), hafnium oxide ($HfO_2$), niobium oxide ($Nb_2O_5$), tantalum oxide ($Ta_2O_5$), and combinations thereof.

The reflective core layer, semiconductor absorber layer and/or dielectric absorber layer can be dry deposited layers, whereas the high index of refraction dielectric layer can be a wet deposited layer. In addition, the reflective core layer can be a central reflective core layer and the semiconductor absorber layer be a pair of semiconductor absorber layers that extend across opposite sides of the central reflective core layer, i.e. the central reflective core layer is sandwiched between the pair of semiconductor absorber layers. Furthermore, the dielectric absorber layer can be a pair of dielectric absorber layers such that the central reflective core layer and the pair of semiconductor absorber layers are sandwiched between the pair of dielectric absorber layers. Finally, the high index of refraction dielectric layer can be a pair of high index of refraction layers such that the central reflective core layer, the pair of semiconductor absorber layers and the pair of dielectric absorber layers are sandwiched between the pair of high index of refraction dielectric layers.

A process for making such an omnidirectional high chroma red structural color includes manufacturing the multilayer stack by dry depositing the reflective core layer, dry depositing the semiconductor absorber layer that extends across the reflective core layer and dry depositing the dielectric absorber layer that extends across the semiconductor absorber layer. Then, the high index of refraction dielectric layer that extends across the semiconductor absorber layer is wet deposited thereon. In this manner, a hybrid manufacturing process is used to produce an omnidirectional high chroma red structural color that can be used for pigments, coatings, and the like.

DETAILED DESCRIPTION OF THE INVENTION

Figure 1:
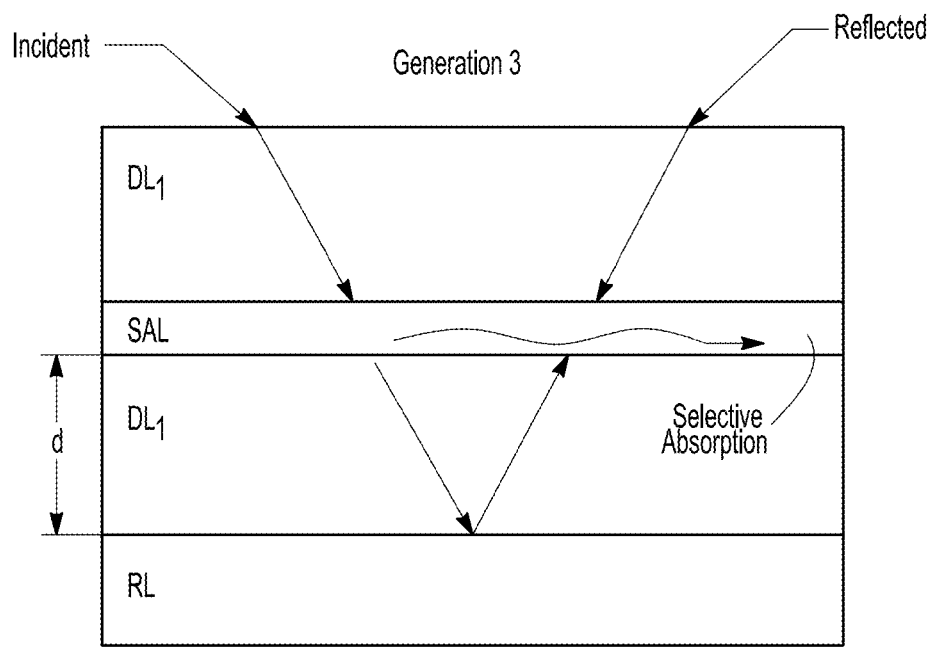
FIG. 1 is a schematic illustration of an omnidirectional structural color multilayer stack made from a dielectric layer, a selective absorbing layer (SAL) and a reflector layer.

An omnidirectional high chroma red structural color pigment is provided. The omnidirectional high chroma red structural color is in the form of a multilayer stack that has a reflective core layer, a semiconductor absorber layer, a dielectric absorber layer and a high index of refraction dielectric layer. The semiconductor absorber layer extends across the reflective core layer and in some instances is located directly against or on top of the reflective core layer. The dielectric absorber layer extends across the semiconductor absorber layer and in some instances is located directly against or on top of the semiconductor absorber layer. The high index of refraction dielectric layer extends across the semiconductor absorber layer and in some instances is directly against or on top of the semiconductor absorber layer. The multilayer stack can be a symmetric stack, i.e. the reflective core layer is a central reflective core layer that is bounded by a pair of semiconductor absorber layers, the pair of semiconductor absorber layers are bounded by a pair of dielectric absorber layers and the pair of dielectric absorber layers are bounded by a pair of high index of refraction dielectric layers.

The multilayer stack reflects a single band of visible light that has a red color with a hue between 0-40°, and preferably between 10-30°, on an a*b* Lab color map. In addition, the hue shift of the single band of visible light is less than 30°, preferably less than 20°, and more preferably less than 10° on the a*b* Lab color map when the multilayer stack is viewed from all angles between 0-45° normal to an outer surface thereof. As such, the hue shift of the single band of reflected visible light can be within the 0-40° region, and preferably between the 10-30° region, on the a*b* Lab color map.

The reflective core layer can be a dry deposited layer with a thickness between 50-200 nm, inclusive. The term "dry deposited" refers to dry deposition techniques such as physical vapor deposition (PVD) techniques including electron beam deposition, sputtering, chemical vapor deposition (CVD), plasma assisted CVD, and the like. In some instances, the reflective core layer is made from a reflective metal such as Al, Ag, Pt, Sn, combinations thereof, and the like. In other instances, the reflective core layer is made from a colorful metal such as Au, Cu, brass, bronze, combinations thereof, and the like. It is appreciated that the terms "brass" and "bronze" refers to copper-zinc alloys and copper-tin alloys, respectively, known to those skilled in the art.

The semiconductor absorber layer can also be a dry deposited layer that is deposited onto the reflective core layer. In the alternative, the reflective core layer can be deposited onto the semiconductor absorber layer. The semiconductor absorber layer can have a thickness between 5-500 nm, inclusive, and be made from a semiconductor material such as amorphous silicon, germanium, combinations thereof, and the like.

The dielectric absorber layer can also be a dry deposited layer that is deposited onto the semiconductor absorber layer. In the alternative, the semiconductor absorber layer can be deposited onto the dielectric absorber layer. The dielectric absorber layer can have a thickness between 5-500 nm, inclusive, and be made from a dielectric material such as iron oxide ($Fe_2O_3$) and the like.

The high index of refraction dielectric layer can be a wet deposited layer where the term "high index of refraction" refers to an index of refraction greater than 1.6. Also, the term "wet deposited" refers to wet deposition techniques such as sol-gel techniques, spin coating techniques, wet chemistry deposition techniques, and the like. The high index of refraction dielectric layer has a thickness D that obeys the relation $0.1$ QW<D≤4 QW, where QW is a quarter wave thickness for a target wavelength, i.e. QW=$\lambda_t/4$ where $\lambda_t$ is a target or desired reflected wavelength. The target wavelength has the predefined hue within the 0-40°, and preferably between 10-30°, on the a*b* Lab color map. In some instances, the target wavelength is between 600-700 nanometers and the dielectric layer is made from a dielectric material such as ZnS, $TiO_2$, $HfO_2$, $Nb_2O_5$, $Ta_2O_5$, combinations thereof, and the like.

The overall thickness of the multilayer stack can be less than 3 microns, preferably less than 2 microns, more preferably less than 1.5 microns, and still more preferably less than or equal to 1.0 microns. In addition, the multilayer stack can have less than or equal to 9 total layers and preferably less than or equal to 7 total layers, and more preferably less than or equal to 5 total layers.

Referring to FIG. 1, a design is shown in which an underlying reflector layer (RL) has a first dielectric material layer $DL_1$ extending thereacross and a selective absorbing layer SAL extending across the $DL_1$ layer. In addition, another $DI_1$ layer may or may not be provided and extend across the selective absorbing layer. Also shown in the figure is an illustration that all of the incident electromagnetic radiation is either reflected or selectively absorbed by the multilayer structure.

Such a design as illustrated in FIG. 1 corresponds to a different approach that is used for designing and manufacturing a desired multilayer stack. In particular, a zero or near-zero energy point thickness for a dielectric layer is used and discussed below.

Figure 2A:
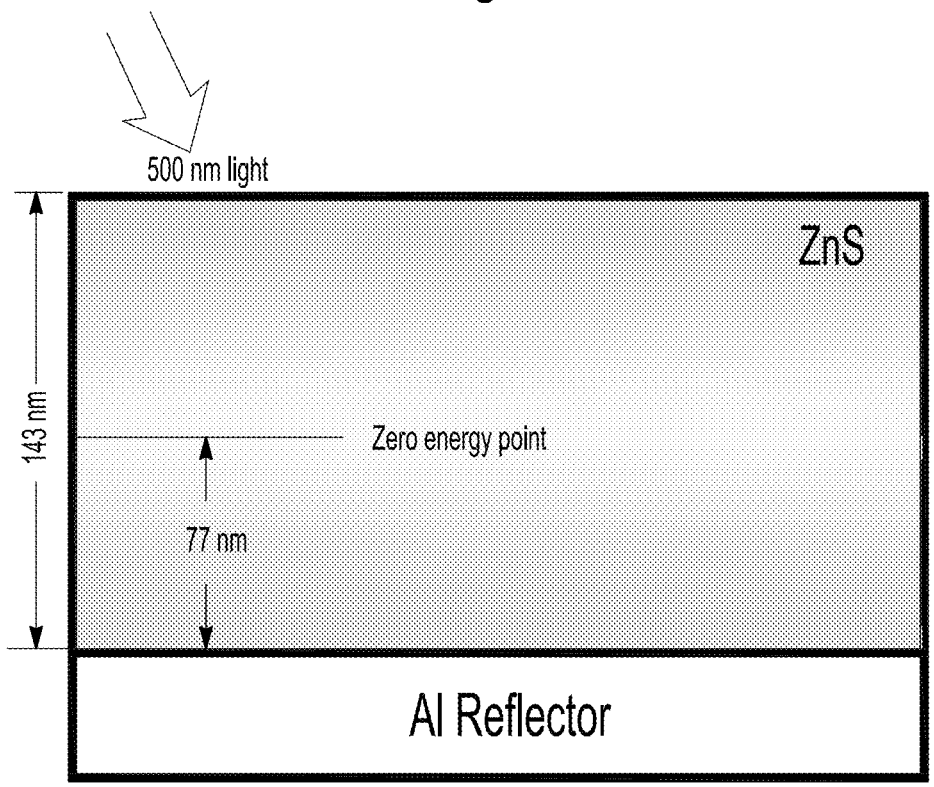
FIG. 2A is a schematic illustration of a zero or near-zero electric field point within a ZnS dielectric layer exposed to electromagnetic radiation (EMR) having a wavelength of 500 nm.
Figure 2B:
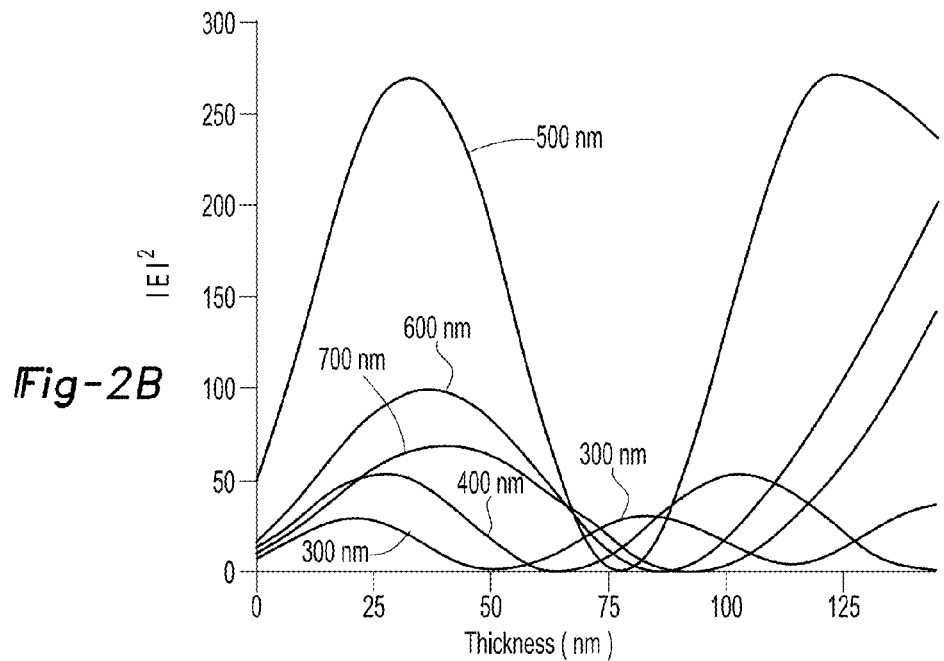
FIG. 2B is a graphical illustration of the absolute value of electric field squared ($|E|^2$) versus thickness of the ZnS dielectric layer shown in FIG. 2A when exposed to EMR having wavelengths of 300, 400, 500, 600 and 700 nm.

For example, FIG. 2A is a schematic illustration of a ZnS dielectric layer extending across an Al reflector core layer. The ZnS dielectric layer has a total thickness of 143 nm, and for incident electromagnetic radiation with a wavelength of 500 nm, a zero or near-zero energy point is present at 77 nm. Stated differently, the ZnS dielectric layer exhibits a zero or near-zero electric field at a distance of 77 nm from the Al reflector layer for incident electromagnetic radiation (EMR) having a wavelength of 500 nm. In addition, FIG. 2B provides a graphical illustration of the energy field across the ZnS dielectric layer for a number of different incident EMR wavelengths. As shown in the graph, the dielectric layer has a zero electric field for the 500 nm wavelength at 77 nm thickness, but a non-zero electric field at the 77 nm thickness for EMR wavelengths of 300, 400, 600 and 700 nm.

Figure 3:
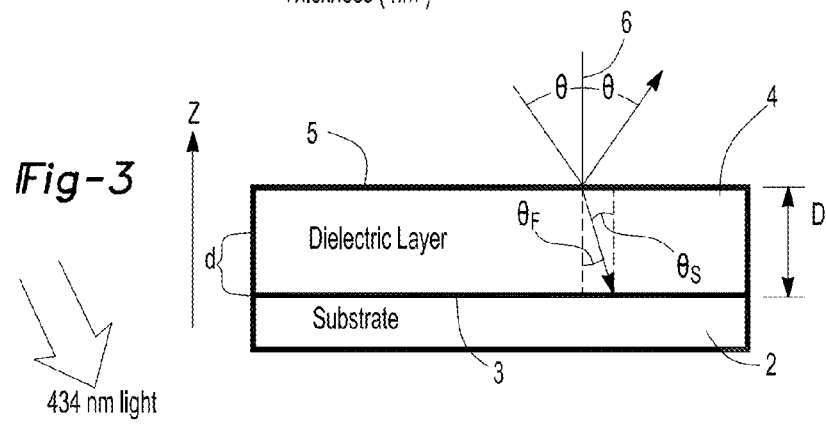
FIG. 3 is a schematic illustration of a dielectric layer extending over a substrate or reflector layer and exposed to electromagnetic radiation at an angle θ relative to a normal direction to the outer surface of the dielectric layer.

Regarding calculation of a zero or near-zero electric field point, FIG. 3 illustrates a dielectric layer 4 having a total thickness 'D', an incremental thickness 'd' and an index of refraction 'n' on a substrate or core layer 2 having an index of refraction $n_s$. Incident light strikes the outer surface 5 of the dielectric layer 4 at angle θ relative to line 6, which is perpendicular to the outer surface 5, and reflects from the outer surface 5 at the same angle θ. Incident light is transmitted through the outer surface 5 and into the dielectric layer 4 at an angle $\theta_F$ relative to the line 6 and strikes the surface 3 of substrate layer 2 at an angle $\theta_s$.

For a single dielectric layer, $\theta_s=\theta_F$ and the energy/electric field (E) can be expressed as E(z) when z=d. From Maxwell's equations, the electric field can be expressed for s polarization as:

$$\overline{E}(d)=\{u(z),0,0\}\exp(ik\alpha y)|_{z=d} \quad (1)$$

and for p polarization as:

$$\overline{E}(d) = \left\{0, u(z), -\frac{\alpha}{\overline{\varepsilon}(z)}v(z)\right\}\exp(ik\alpha y)\bigg|_{z=d} \quad (2)$$

where $$k = \frac{2\pi}{\lambda}$$

and λ is a desired wavelength to be reflected. Also, α=$n_s$ sin $\theta_s$ where 's' corresponds to the substrate in FIG. 5 and $\overline{\varepsilon}(z)$ is the permittivity of the layer as a function of z. As such, $$|E(d)|^2=|u(z)|^2\exp(2ik\alpha y)|_{z=d} \quad (3)$$

for s polarization and $$|E(d)|^2 = \left[|u(z)|^2 + \left|\frac{\alpha}{\sqrt{n}}v(z)\right|^2\right]\exp(ik\alpha y)\bigg|_{z=d} \quad (4)$$

for p polarization.

It is appreciated that variation of the electric field along the Z direction of the dielectric layer 4 can be estimated by calculation of the unknown parameters u(z) and v(z) where it can be shown that:

$$\begin{pmatrix} u \\ v \end{pmatrix}_{z=d} = \begin{pmatrix} \cos\varphi & (i/q)\sin\varphi \\ iq\sin\varphi & \cos\varphi \end{pmatrix}\begin{pmatrix} u \\ v \end{pmatrix}_{z=0,substrate} \quad (5)$$

Naturally, 'i' is the square root of −1. Using the boundary conditions $u|_{z=0}=1$, $v|_{z=0}=q_s$, and the following relations:

$$q_s=n_s \cos \theta_s \text{ for } s\text{-polarization} \quad (6)$$

$$q_s=n_s/\cos \theta_s \text{ for } p\text{-polarization} \quad (7)$$

$$q_s=n \cos \theta_F \text{ for } s\text{-polarization} \quad (8)$$

$q = n/\cos\theta_F$ for $p$-polarization (9)

$\phi = k \cdot n \cdot d \cos(\theta_F)$ (10)

u(z) and v(z) can be expressed as:

$$u(z)|_{z=d} = u|_{z=0}\cos\varphi + v|_{z=0}\left(\frac{i}{q}\sin\varphi\right) \quad (11)$$
$$= \cos\varphi + \frac{i \cdot q_s}{q}\sin\varphi$$

and $$v(z)|_{z=d} = iqu|_{z=0}\sin\varphi + v|_{z=0}\cos\varphi \quad (12)$$
$$= iq\sin\varphi + q_s\cos\varphi$$

Therefore:

$$|E(d)|^2 = \left[\cos^2\varphi + \frac{q_s^2}{q^2}\sin^2\varphi\right]e^{2ik\alpha y} \quad (13)$$
$$= \left[\cos^2\varphi + \frac{n_s^2}{n^2}\sin^2\varphi\right]e^{2ik\alpha y}$$

for s polarization with $\phi = k \cdot n \cdot d \cos(\theta_F)$, and:

$$|E(d)|^2 = \left[\cos^2\varphi + \frac{n_s^2}{n^2}\sin^2\varphi + \frac{\alpha^2}{n}(q_s^2\cos^2\varphi + q^2\sin^2\varphi)\right] \quad (14)$$
$$= \left[\left(1 + \frac{\alpha^2 q_s^2}{n}\right)\cos^2\varphi + \left(\frac{n_s^2}{n^2} + \frac{\alpha^2 q^2}{n}\right)\sin^2\varphi\right]$$

for p polarization where:

$$\alpha = n_s\sin\theta_s = n\sin\theta_F \quad (15)$$

$$q_s = \frac{n_s}{\cos\theta_s} \quad (16)$$

and $$q_s = \frac{n}{\cos\theta_F} \quad (17)$$

Thus for a simple situation where $\theta_F = 0$ or normal incidence, $\phi = k \cdot n \cdot d$, and $\alpha = 0$:

$$|E(d)|^2 = \text{for } s\text{-polarization} = \quad (18)$$

$$|E(d)|^2 = \text{for } p\text{-polarization} = \left[\cos^2\varphi + \frac{n_s^2}{n^2}\sin^2\varphi\right]$$

$$= \left[\cos^2(k \cdot n \cdot d) + \frac{n_s^2}{n^2}\sin^2(k \cdot n \cdot d)\right] \quad (19)$$

which allows for the thickness to be solved for, i.e. the position or location within the dielectric layer where the electric field is zero.

Figure 4:
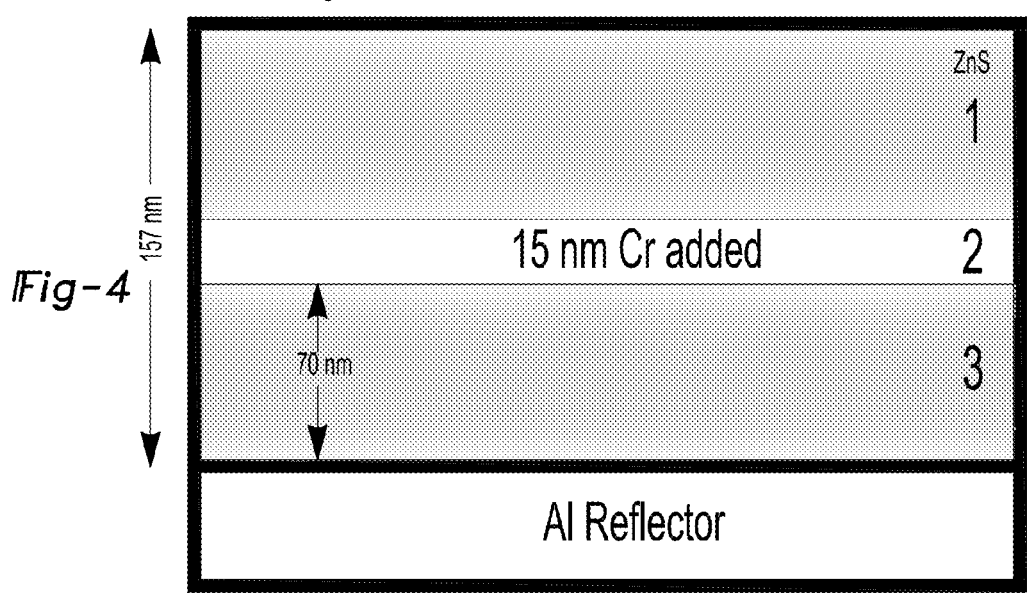
FIG. 4 is a schematic illustration of a ZnS dielectric layer with a Cr absorber layer located at the zero or near-zero electric field point within the ZnS dielectric layer for incident EMR having a wavelength of 434 nm.

Referring now to FIG. 4, Equation 19 was used to calculate that the zero or near-zero electric field point in the ZnS dielectric layer shown in FIG. 2A when exposed to EMR having a wavelength of 434 nm. The zero or near-zero electric field point was calculated to be 70 nm (instead of 77 nm for a 500 nm wavelength). In addition, a 15 nm thick Cr absorber layer was inserted at the thickness or distance of 70 nm from the Al reflector core layer to afford for a zero or near-zero electric field ZnS—Cr interface. Such an inventive structure allows light having a wavelength of 434 nm to pass through the Cr—ZnS interfaces, but absorbs light not having a wavelength of 434 nm. Stated differently, the Cr—ZnS interfaces have a zero or near-zero electric field with respect to light having a wavelength of 434 nm and thus 434 nm light passes through the interfaces. However, the Cr—ZnS interfaces do not have a zero or near-zero electric field for light not having a wavelength of 434 nm and thus such light is absorbed by the Cr absorber layer and/or Cr—ZnS interfaces and not reflected by the Al reflector layer.

It is appreciated that some percentage of light within +/−10 nm of the desired 434 nm will pass through the Cr—ZnS interface. However, it is also appreciated that such a narrow band of reflected light, e.g. 434+/−10 nm, still provides a sharp structural color to a human eye.

Figure 5:
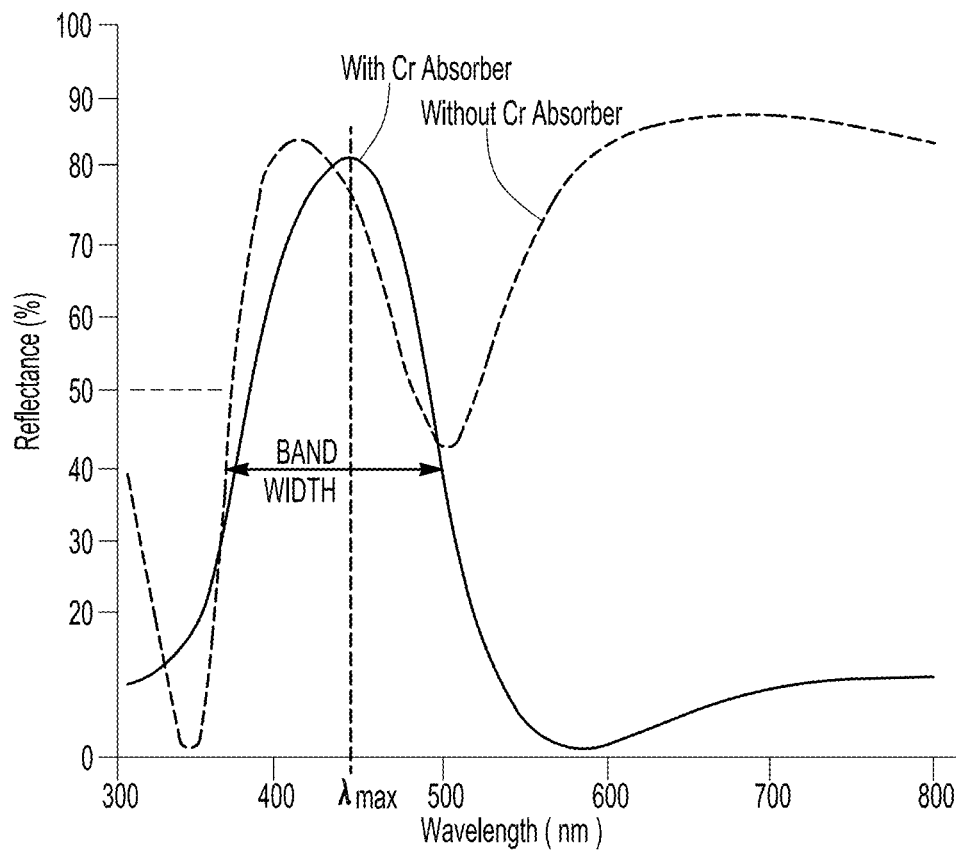
FIG. 5 is a graphical representation of percent reflectance versus reflected EMR wavelength for a multilayer stack without a Cr absorber layer (e.g., FIG. 2A) and a multilayer stack with a Cr absorber layer (e.g., FIG. 4) exposed to white light.

The result of the Cr absorber layer in the multilayer stack in FIG. 4 is illustrated in FIG. 5 where percent reflectance versus reflected EMR wavelength is shown. As shown by the dotted line, which corresponds to the ZnS dielectric layer shown in FIG. 4 without a Cr absorber layer, a narrow reflected peak is present at about 400 nm, but a much broader peak is present at about 550+ nm. In addition, there is still a significant amount of light reflected in the 500 nm wavelength region. As such, a double peak that prevents the multilayer stack from having or exhibiting a structural color is present.

In contrast, the solid line in FIG. 5 corresponds to the structure shown in FIG. 4 with the Cr absorber layer present. As shown in the figure, a sharp peak at approximately 434 nm is present and a sharp drop off in reflectance for wavelengths greater than 434 nm is afforded by the Cr absorber layer. It is appreciated that the sharp peak represented by the solid line visually appears as a sharp/structural color. Also, FIG. 5 illustrates where the width of a reflected peak or band is measured, i.e. the width of the band is determined at 50% reflectance of the maximum reflected wavelength, also known as full width at half maximum (FWHM).

Regarding omnidirectional behavior of the multilayer structure shown in FIG. 4, the thickness of the ZnS dielectric layer can be designed or set such that only the first harmonics of reflected light is provided. It is appreciated that this is sufficient for a "blue" color, however the production of a "red" color requires additional considerations. For example, the control of angular independence for red color is difficult since thicker dielectric layers are required, which in turn results in a high harmonic design, i.e. the presence of the second and possible third harmonics is inevitable. Also, the dark red color hue space is very narrow. As such, a red color multilayer stack has a higher angular variance.

Figure 6A:
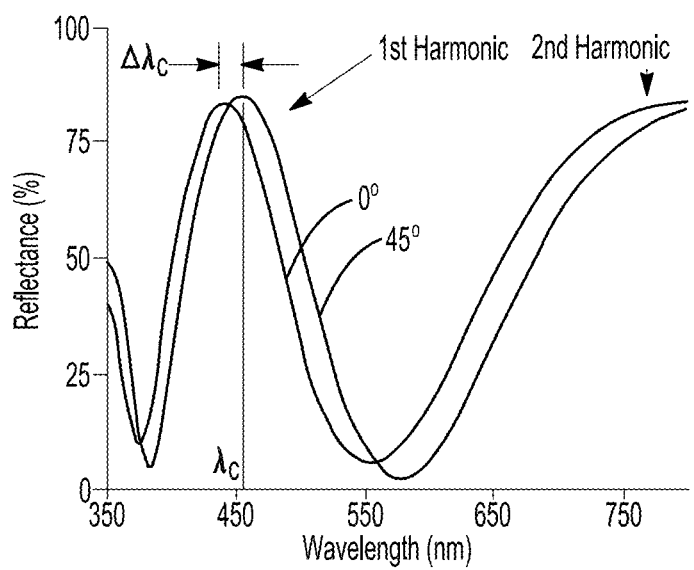
FIG. 6A is a graphical illustration of first harmonics and second harmonics exhibited by a ZnS dielectric layer extending over an Al reflector layer (e.g., FIG. 2A)

In order to overcome the higher angular variance for red color, the instant application discloses a unique and novel design/structure that affords for a red color that is angular independent. For example, FIG. 6A illustrates a dielectric layer exhibiting first and second harmonics for incident white light when an outer surface of the dielectric layer is viewed from 0 and 45° relative to the normal of the outer surface. As shown by the graphical representation, low angular dependence (small $\Delta\lambda_c$) is provided by the thickness of the dielectric layer, however, such a multilayer stack has a combination of blue color ($1^{st}$ harmonic) and red color ($2^{nd}$ harmonic) and thus is not suitable for a desired "red only" color. Therefore, the concept/structure of using an absorber layer to absorb an unwanted harmonic series has been developed. FIG. 6A also illustrates an example of the location of the reflected band center wavelength ($\lambda_c$) for a given reflection peak and the dispersion or shift of the center wavelength ($\Delta\lambda_c$) when the sample is viewed from 0 and 45°.

Figure 6B:
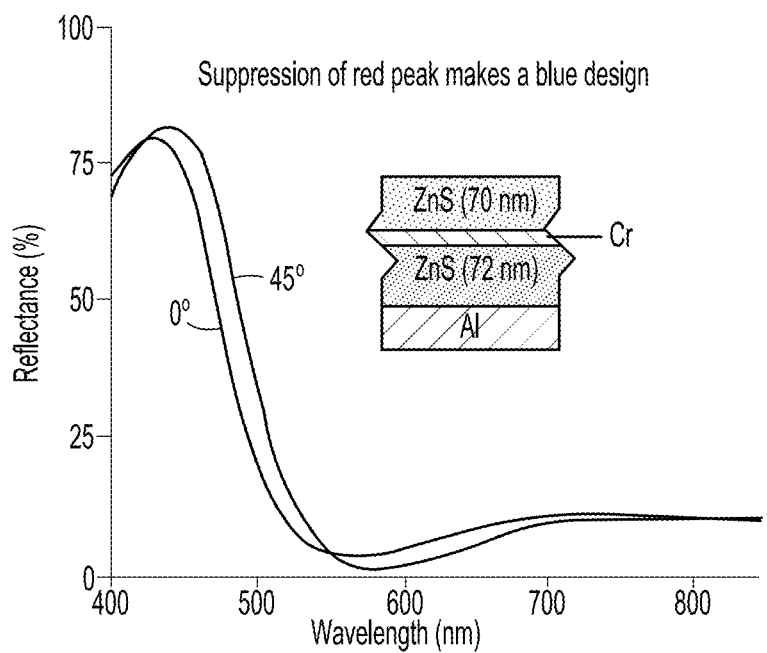
FIG. 6B is a graphical illustration of percent reflectance versus reflected EMR wavelength for a multilayer stack with a ZnS dielectric layer extending across an Al reflector layer, plus a Cr absorber layer located within the ZnS dielectric layer such that the second harmonics shown in FIG. 6A are absorbed.
Figure 6C:
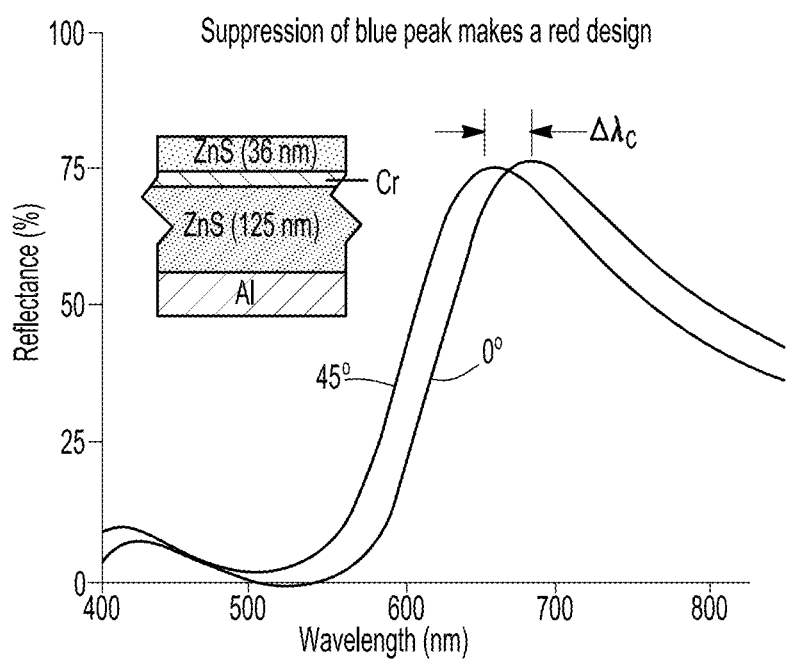
FIG. 6C is a graphical illustration of percent reflectance versus reflected EMR wavelength for a multilayer stack with a ZnS dielectric layer extending across an Al reflector layer, plus a Cr absorber layer located within the ZnS dielectric layer such that the first harmonics shown in FIG. 6A are absorbed.

Turning now to FIG. 6B, the second harmonic shown in FIG. 6A is absorbed with a Cr absorber layer at the appropriate dielectric layer thickness (e.g. 72 nm) and a sharp blue color is provided. Also, FIG. 6C illustrates that by absorbing the first harmonics with the Cr absorber at a different dielectric layer thickness (e.g. 125 nm) a red color is provided. However, FIG. 6C also illustrates that the use of the Cr absorber layer can result in more than desired angular dependence by the multilayer stack, i.e. a larger than desired $\Delta\lambda_c$.

Figure 7A:
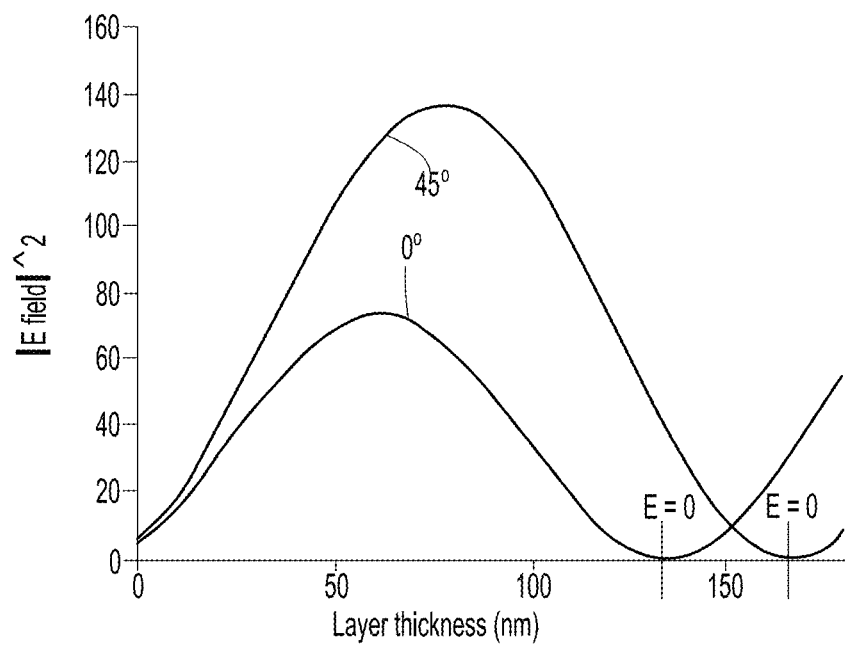
FIG. 7A is a graphical illustration of electric field squared versus dielectric layer thickness showing the electric field angular dependence of a Cr absorber layer for exposure to incident light at 0 and 45 degrees.

It is appreciated that the relatively large shift in $\lambda_c$ for the red color compared to the blue color is due to the dark red color hue space being very narrow and the fact that the Cr absorber layer absorbs wavelengths associated with a non-zero electric field, i.e. does not absorb light when the electric field is zero or near-zero. As such, FIG. 7A illustrates that the zero or non-zero point is different for light wavelengths at different incident angles. Such factors result in the angular dependent absorbance shown in FIG. 7B, i.e. the difference in the 0° and 45° absorbance curves. Thus in order to further refine the multilayer stack design and angular independence performance, an absorber layer that absorbs, e.g. blue light, irrespective of whether or not the electric field is zero or not, is used.

Figure 7B:
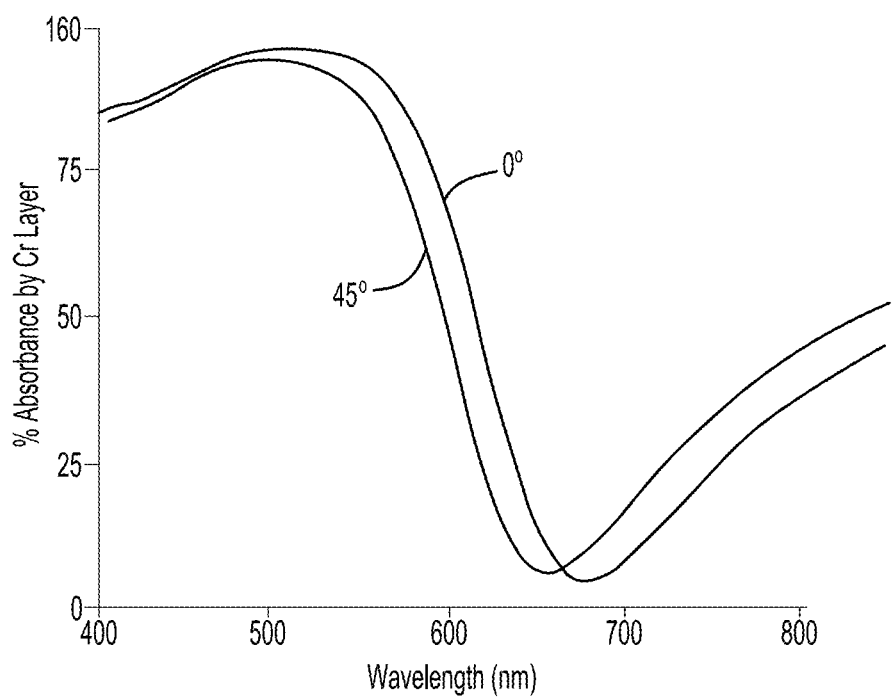
FIG. 7B is a graphical illustration of percent absorbance by a Cr absorber layer versus reflected EMR wavelength when exposed to white light at 0 and 45° angles relative to normal of the outer surface (0° being normal to surface)
Figure 8A:
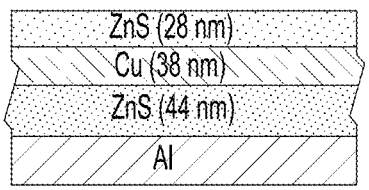
FIG. 8A is a schematic illustration of a red omnidirectional structural color multilayer stack according to an aspect disclosed herein.
Figure 8B:
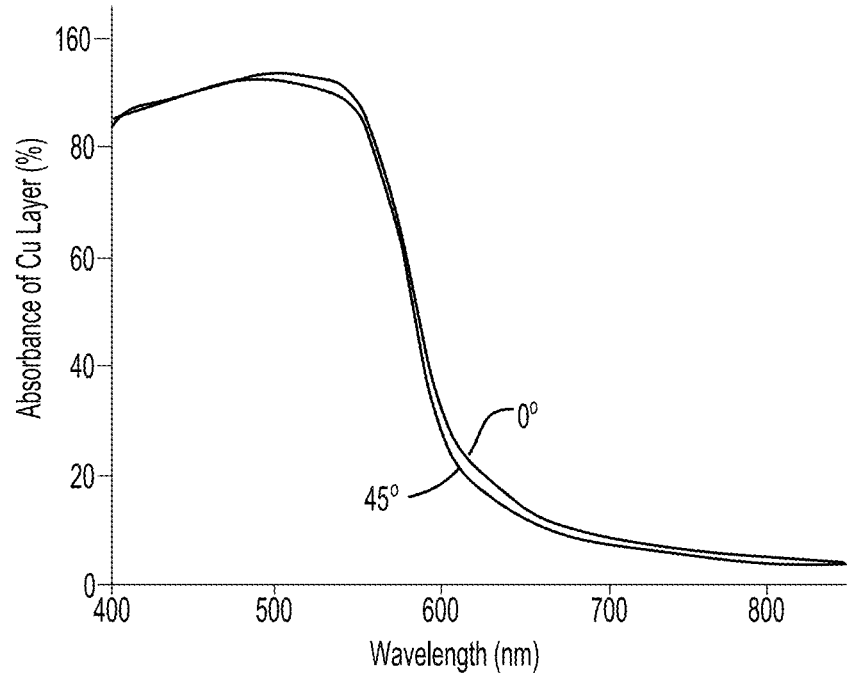
FIG. 8B is a graphical illustration of percent absorbance of the Cu absorber layer shown in FIG. 8A versus reflected EMR wavelength for white light exposure to the multilayer stack shown in FIG. 8A at incident angles of 0 and 45°.

In particular, FIG. 8A shows a multilayer stack with a Cu absorber layer instead of a Cr absorber layer extending across a dielectric ZnS layer. The results of using such a "colorful" or "selective" absorber layer is shown in FIG. 8B which demonstrates a much "tighter" grouping of the 0° and 45° absorbance lines for the multilayer stack shown in FIG. 8A. As such, a comparison between FIG. 8B and FIG. 7B illustrates the significant improvement in absorbance angular independence when using a selective absorber layer rather than non-selective absorber layer.

Figure 9:
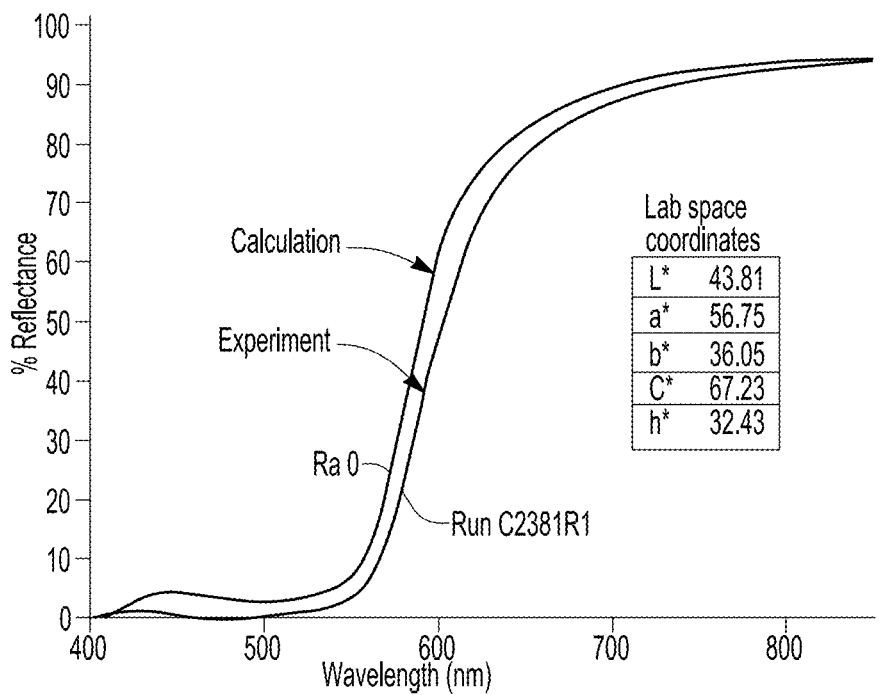
FIG. 9 is a graphical comparison between calculation/simulation data and experimental data for percent reflectance versus reflected EMR wavelength for a proof of concept red omnidirectional structural color multilayer stack exposed to white light at an incident angle of 0°.

Based on the above, a proof of concept multilayer stack structure was designed and manufactured. In addition, calculation/simulation results and actual experimental data for the proof of concept sample were compared. In particular, and as shown by the graphical plot in FIG. 9, a sharp red color was produced (wavelengths greater than 700 nm are not typically seen by the human eye) and very good agreement was obtained between the calculation/simulation and experimental light data obtained from the actual sample. Stated differently, calculations/simulations can and/or are used to simulate the results of multilayer stack designs according to one or more embodiments disclosed herein and/or prior art multilayer stacks.

Figure 10:
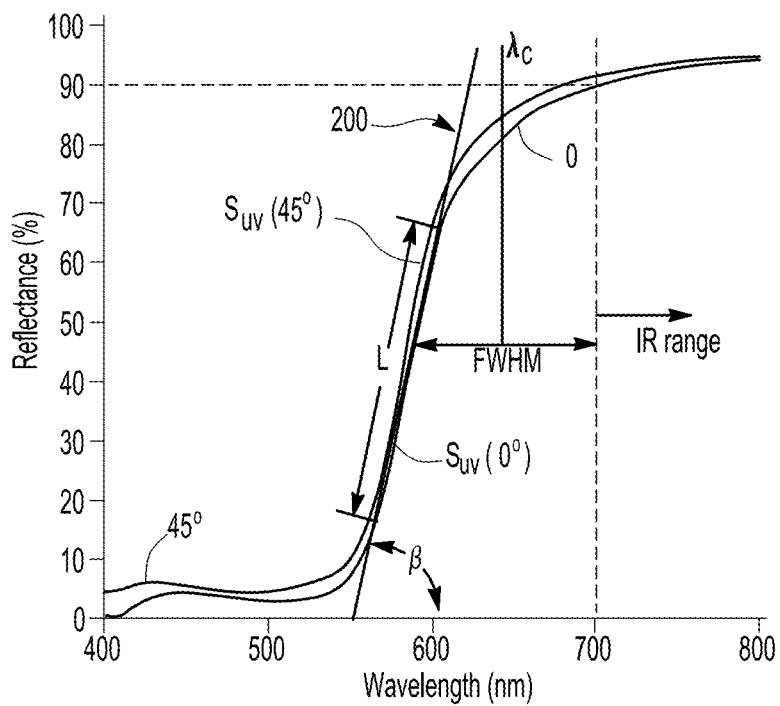
FIG. 10 is a graphical illustration of percent reflectance versus wavelength for an omnidirectional structural color multilayer stack according to an aspect disclosed herein.

FIG. 10 shows a plot of percent reflectance versus reflected EMR wavelength for another omnidirectional reflector design when exposed to white light at angles of 0 and 45° relative to the normal of the outer surface of the reflector. As shown by the plot, both the 0° and 45° curves illustrate very low reflectance, e.g. less than 10%, provided by the omnidirectional reflector for wavelengths less than 550 nm. However, the reflector, as shown by the curves, provides a sharp increase in reflectance at wavelengths between 560-570 nm and reaches a maximum of approximately 90% at 700 nm. It is appreciated that the portion or region of the graph on the right hand side (IR side) of the curve represents the IR-portion of the reflection band provided by the reflector.

The sharp increase in reflectance provided by the omnidirectional reflector is characterized by a UV-sided edge of each curve that extends from a low reflectance portion at wavelengths below 550 nm up to a high reflectance portion, e.g. >70%. A linear portion 200 of the UV-sided edge is inclined at an angle ($\beta$) greater than 60° relative to the x-axis, has a length L of approximately 40 on the Reflectance-axis and a slope of 1.4. In some instances, the linear portion is inclined at an angle greater than 70° relative to the x-axis, while in other instances $\beta$ is greater than 75°. Also, the reflection band has a visible FWHM of less than 200 nm, and in some instances a visible FWHM of less than 150 nm, and in other instances a visible FWHM of less than 100 nm. In addition, the center wavelength $\lambda_c$ for the visible reflection band as illustrated in FIG. 10 is defined as the wavelength that is equal-distance between the UV-sided edge of the reflection band and the IR edge of the IR spectrum at the visible FWHM.

It is appreciated that the term "visible FWHM" refers to the width of the reflection band between the UV-sided edge of the curve and the edge of the IR spectrum range, beyond which reflectance provided by the omnidirectional reflector is not visible to the human eye. In this manner, the inventive designs and multilayer stacks disclosed herein use the non-visible IR portion of the electromagnetic radiation spectrum to provide a sharp or structural color. Stated differently, the omnidirectional reflectors disclosed herein take advantage of the non-visible IR portion of the electromagnetic radiation spectrum in order to provide a narrow band of reflected visible light, despite the fact that the reflectors may reflect a much broader band of electromagnetic radiation that extends into the IR region.

Figure 11:
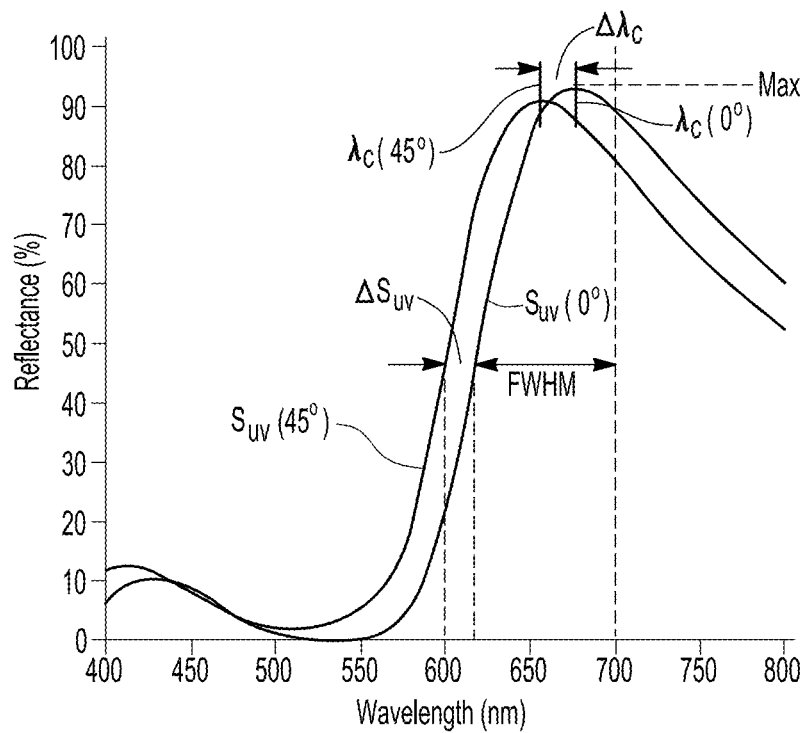
FIG. 11 is a graphical illustration of percent reflectance versus wavelength for an omnidirectional structural color multilayer stack according to an aspect disclosed herein.

Referring now to FIG. 11, a plot of percent reflectance versus wavelength is shown for another seven-layer design omnidirectional reflector when exposed to white light at angles of 0 and 45° relative to the surface of the reflector. In addition, a definition or characterization of omnidirectional properties provided by omnidirectional reflectors disclosed herein is shown. In particular, and when the reflection band provided by an inventive reflector has a maximum, i.e. a peak, as shown in the figure, each curve has a center wavelength ($\lambda_c$) defined as the wavelength that exhibits or experiences maximum reflectance. The term maximum reflected wavelength can also be used for $\lambda_c$.

As shown in FIG. 11, there is shift or displacement of $\lambda_c$ when an outer surface of the omnidirectional reflector is observed from an angle 45° ($\lambda_c(45°)$), e.g. the outer surface is tilted 45° relative to a human eye looking at the surface, compared to when the surface is observed from an angle of 0° (($\lambda_c(0°)$), i.e. normal to the surface. This shift of $\lambda_c$ ($\Delta\lambda_c$) provides a measure of the omnidirectional property of the omnidirectional reflector. Naturally a zero shift, i.e. no shift at all, would be a perfectly omnidirectional reflector. However, omnidirectional reflectors disclosed herein can provide $\Delta\lambda_c$ of less than 50 nm, which to the human eye can appear as though the surface of the reflector has not changed color and thus from a practical perspective the reflector is omnidirectional. In some instances, omnidirectional reflectors disclosed herein can provide a $\Delta\lambda_c$ of less than 40 nm, in other instances a $\Delta\lambda_c$ of less than 30 nm, and in still other instances a $\Delta\lambda_c$ of less than 20 nm, while in still yet other instances a $\Delta\lambda_c$ of less than 15 nm. Such a shift in $\Delta\lambda_c$ can be determined by an actual reflectance versus wavelength plot for a reflector, and/or in the alternative, by modeling of the reflector if the materials and layer thicknesses are known.

Another definition or characterization of a reflector's omnidirectional properties can be determined by the shift of a side edge for a given set of angle refection bands. For example, and with reference to FIG. 11, a shift or displacement of a UV-sided edge ($\Delta S_{UV}$) for reflectance from an omnidirectional reflector observed from 0° ($S_{UV}(0°)$) compared to the UV-sided edge for reflectance by the same reflector observed from 45° ($S_{UV}(45°)$) provides a measure of the omnidirectional property of the omnidirectional reflector. It is appreciated that the shift of the UV-sided edge ($\Delta S_{UV}$) is and/or can be measured at the visible FWHM.

Naturally a zero shift, i.e. no shift at all ($\Delta S_{UV}=0$ nm), would characterize a perfectly omnidirectional reflector. However, omnidirectional reflectors disclosed herein can provide a $\Delta S_{UV}$ of less than 50 nm, which to the human eye can appear as though the surface of the reflector has not changed color and thus from a practical perspective the reflector is omnidirectional. In some instances, omnidirectional reflectors disclosed herein can provide a $\Delta S_{UV}$ of less than 40 nm, in other instances a $\Delta S_{UV}$ of less than 30 nm, and in still other instances a $\Delta S_{UV}$ of less than 20 nm, while in still yet other instances a $\Delta S_{UV}$ of less than 15 nm. Such a shift in $\Delta S_{UV}$ can be determined by an actual reflectance versus wavelength plot for a reflector, and/or in the alternative, by modeling of the reflector if the materials and layer thicknesses are known.

Figure 12:
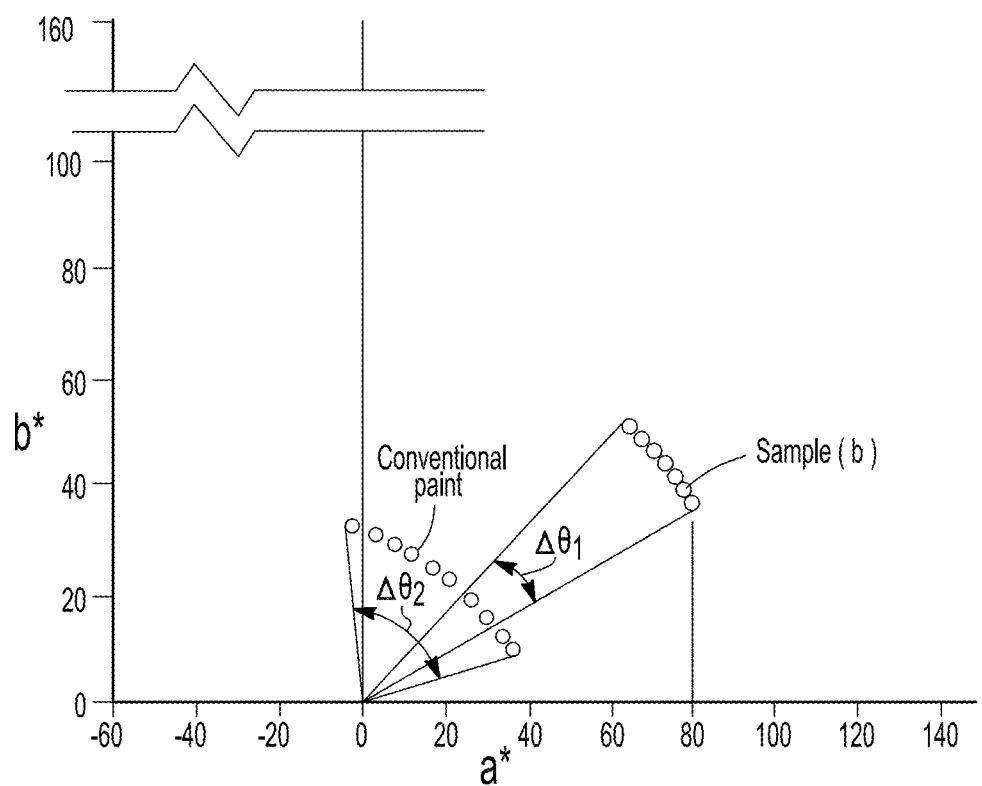
FIG. 12 is a graphical representation of a portion of an a*b* color map using the CIELAB (Lab) color space in which the chroma and hue shift of a conventional paint and a paint made from pigments according to an aspect disclosed herein are compared (Sample (b))

The shift of an omnidirectional reflection can also be measured by a low hue shift. For example, the hue shift of pigments manufactured from multilayer stacks according an aspect disclosed herein is 30° or less, as shown in FIG. 12 (see e.g., $\Delta\theta_1$), and in some instances the hue shift is 25° or less, preferably less than 20°, more preferably less than 15° and still more preferably less than 10°. In contrast, traditional pigments exhibit hue shift of 45° or more (see e.g. $\Delta\theta_2$). It is appreciated that the hue shift associated with $\Delta\theta_1$ generally corresponds to a red color, however the low hue shift is relevant for any color reflected by a hybrid omnidirectional structural color pigment disclosed herein.

Figure 13:
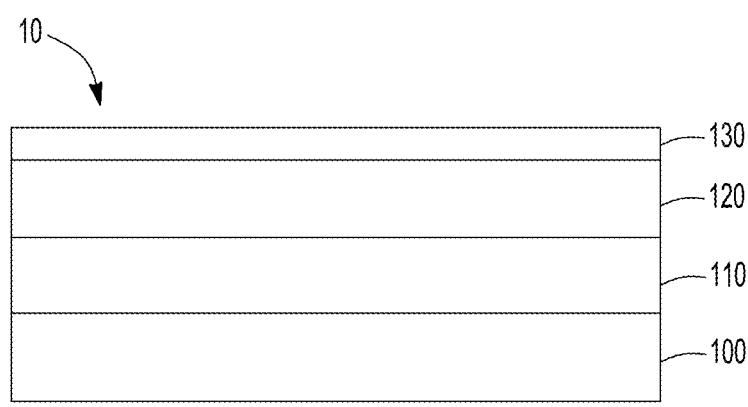
FIG. 13 is a schematic illustration of a red omnidirectional structural color multilayer stack according to another aspect disclosed herein.

A schematic illustration of an omnidirectional multilayer stack according to another aspect disclosed herein is shown in FIG. 13 at reference numeral 10. The multilayer stack 10 has a first layer 110, a second layer 120 and a third layer 130. An optional reflector layer 100 can be included. Example materials for the reflector layer 100, sometimes referred to as a reflector core layer, can include but is not limited to Al, Ag, Pt, Cr, Cu, Zn, Au, Sn and combinations or alloys thereof. As such, the reflector layer 100 can be a metallic reflector layer, however this is not required. In addition, exemplary thicknesses for the core reflector layer range between 30 to 200 nm.

A symmetric pair of layers can be on an opposite side of the reflector layer 100, i.e. the reflector layer 100 can have another first layer oppositely disposed from the first layer 110 such that the reflector layer 100 is sandwiched between a pair of first layers. In addition, another second layer 120 and third layer 130 can be oppositely disposed the reflector layer 100 such that a seven-layer structure is provided. Therefore, it should be appreciated that the discussion of the multilayer stacks provided herein also includes the possibility of a mirror structure with respect to one or more central layers. As such, FIG. 13 can be illustrative of half of a seven-layer multilayer stack.

Figure 14:
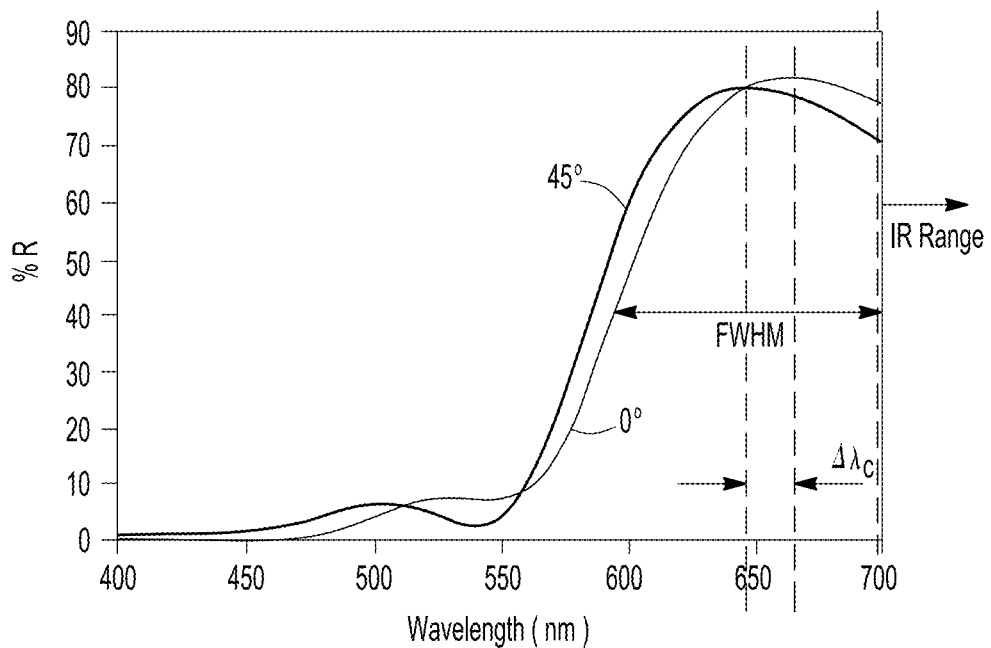
FIG. 14 is a graphical representation of percent reflectance versus wavelength for the aspect shown in FIG. 13.

In contrast to the aspects discussed above, the first layer 110 can be an absorber layer, e.g. a semiconductor absorber layer with a thickness between 5-500 nm, inclusive, and the second layer a dielectric absorber layer with a thickness between 5-500 nm, inclusive. The semiconductor absorber layer 110 can be made from amorphous Si or Ge, and the dielectric absorber layer 120 can be made from $Fe_2O_3$. The semiconductor absorber layer 110 and the dielectric absorber layer 120 absorb electromagnetic radiation as illustrated in FIG. 14 such that wavelengths less than generally 550-575 nm have less than 10-15% reflectance. The third layer 130 can be a high index of refraction dielectric layer with a thickness that affords for the reflection of wavelengths greater than generally 575-600 nm which correspond to a hue between 0-40°, and preferably between 10-30°, on the a*b* Lab color space map. In addition, the chroma for the reflected band of visible light is greater than 70, preferably greater than 80, and more preferably equal to or greater than 90. The reflective spectrum of such a multilayer stack as shown in FIG. 13 with layer thicknesses as listed in Table 1 below is illustratively shown in FIG. 14 for viewing angles of 0° and 45°. As shown in the figure, the shift of the center wavelength is less than 50 nm, preferably less than 30 nm, and still more preferably less than 20 nm. In addition, it is appreciated that the UV side of the reflection band also has a very small shift. In combination with the width of the band in the visible spectrum, the shift of the reflected band between angles of 0 and 45° corresponds to a non-noticeable color change to the human eye.

TABLE 1

| Layer | Material | Thickness (nm) |
|---|---|---|
| 100 | Al | 80 |
| 110 | Amorphous Si | 145 |
| 120 | $Fe_2O_3$ | 29.5 |
| 130 | ZnS or $TiO_2$ | 19 |

Figure 15:
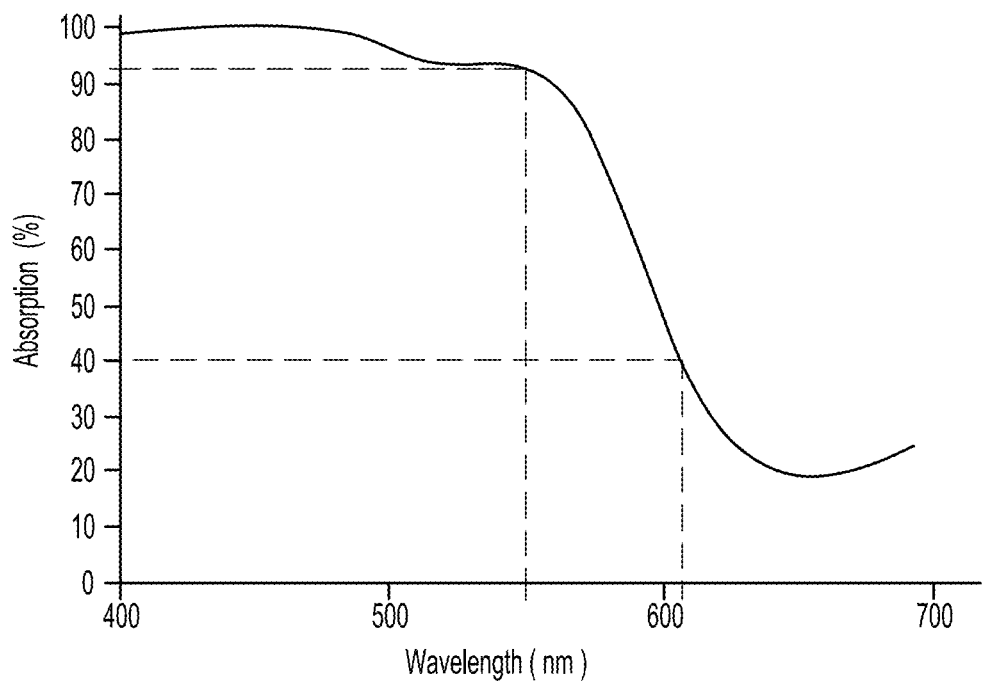
FIG. 15 is a graphical illustration of percent absorbance versus wavelength for the aspect shown in FIG. 13.

FIG. 15 shows an absorption versus wavelength for the design shown in FIG. 13. As shown in this figure, the multilayer stack 10 absorbs over 80% of the visible light spectrum for wavelengths up to approximately 550 nm. In addition, the aspect 10 absorbs more than 40% of all wavelengths up to approximately 610 nm. As such, a combination of the semiconductor absorbing layer 110, dielectric absorbing layer 120 and the dielectric layer 130 provides for a visible reflection band with a hue between 0-40°, and preferably between 10-30°, on the a*b* Lab color space, i.e. reflected wavelengths in the red color spectrum.

Figure 16:
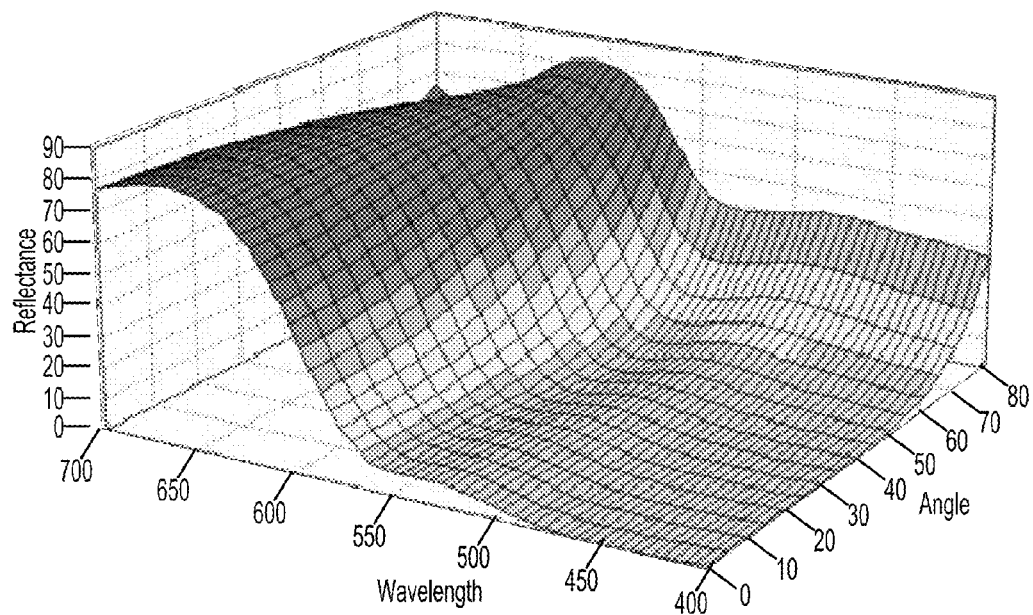
FIG. 16 is a graphical illustration of percent reflectance versus wavelength versus viewing angle for the aspect shown in FIG. 13.

A graphical representation for the aspect 10 is shown in FIG. 16 as a function of percent reflectance, wavelength that is reflected, and angle of viewing. As shown in this 3D contour plot, reflectance is very low, i.e. less than 20% for wavelengths between 400-550-575 nm and viewing angles between 0 to 45-50°. However, a sharp increase in percent reflectance is present at a wavelength of approximately 600 nm.

Figure 17:
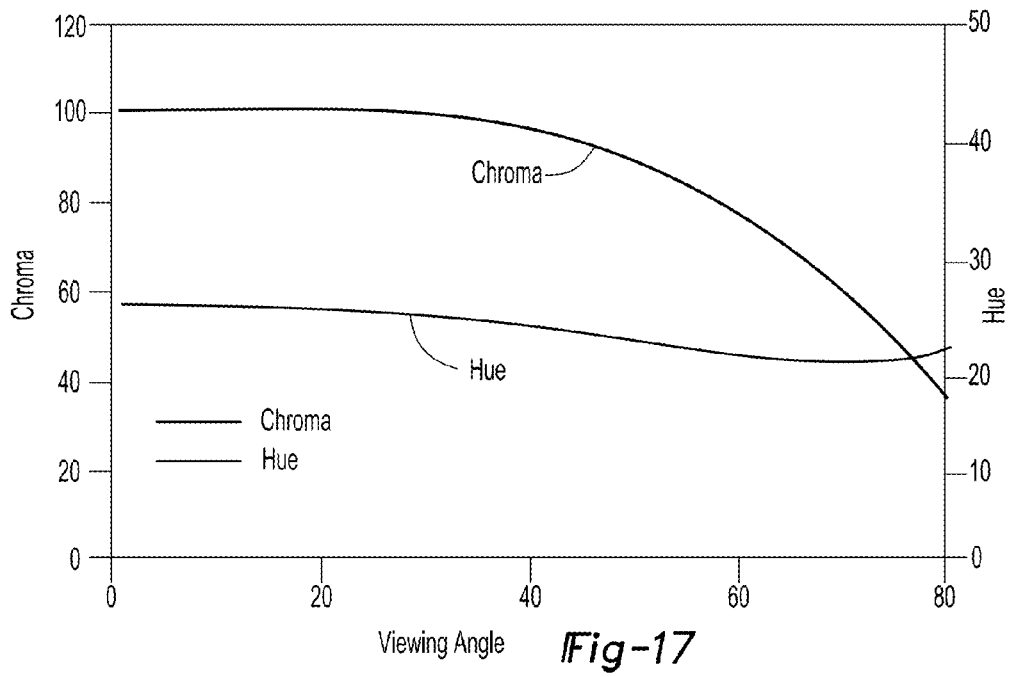
FIG. 17 is a graphical illustration of chroma and hue versus viewing angle for the aspect shown in FIG. 13.

Another method or technique for describing the omnidirectional properties of the inventive multilayer stacks disclosed herein is a plot of chroma and hue versus viewing angle as shown in FIG. 17. FIG. 17 illustrates the reflection characteristics of the aspect shown in FIG. 13 in which the hue for angles between 0 and 45° is between 20-30 and has a change or shift of less than 10°. In addition, the chroma is between 90-100 for all viewing angles between 0-45° where the chroma (C*) is defined as $C^* = \sqrt{a^{*2}+b^{*2}}$ with a* and b* being the coordinates on the Lab color space or map for the color reflected by multilayer stack when exposed to broadband electromagnetic radiation, e.g. white light.

Figure 18:
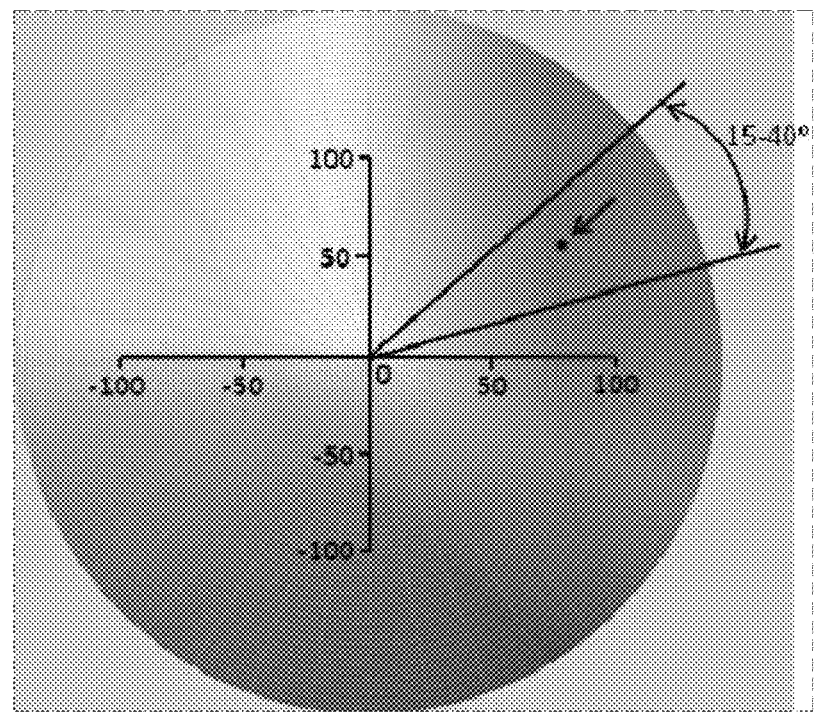
FIG. 18 is a graphical illustration of color reflected by the multilayer stack shown in FIG. 13 with respect to an a*b* Lab color map.

FIG. 18 shows or plots the hue of the aspect shown in FIG. 13 (see data point with arrow pointing thereto) on an a*b* Lab color space map. Also shown on the map is the region between 15-40°. It is appreciated that these two points are illustrated for a 0° viewing angle with respect to the normal of an outer surface of the multilayer stacks. In addition, it is appreciated that between viewing angles of 0-45°, that the hue for the aspect shown in FIG. 13 does not move outside of the 15-40° hue region. Stated differently, the aspect demonstrates a low hue shift, for example less than 30°, preferably less than 20°, and still more preferably less than 10°. It is still further appreciated that the aspects shown in FIG. 13 can also be designed such that a single band of visible light with a hue between 0-40° hue is provided and can be plotted on FIG. 18, and preferably a single band of visible light with a hue between 10-30°.

Figure 19:
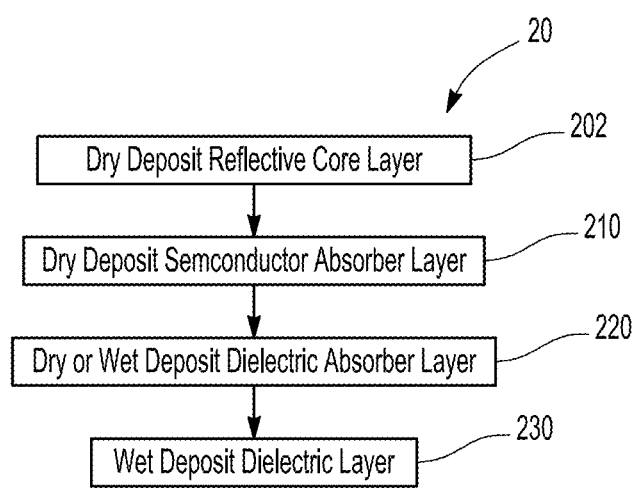
FIG. 19 is a schematic illustration of a process for manufacturing an omnidirectional red structural color multilayer stack according to an embodiment disclosed herein.

Turning now to FIG. 19, a process for manufacturing an omnidirectional high-chroma red structural color is shown generally at reference numeral 20. The process 20 includes dry depositing a reflective core layer at step 202, followed by dry depositing a semiconductor absorber layer onto the dry deposited reflective core layer at step 210. Then, a dielectric absorber layer is dry deposited or wet deposited onto the semiconductor absorber layer at step 220. Thereafter, a high index of refraction dielectric layer is wet deposited onto the dry deposited semiconductor absorber layer at step 230. It is appreciated that steps 210 and 220 can be repeated in order to produce additional layers onto the dry deposited reflective core layer. In addition, the dry deposited reflective core layer can be deposited onto the semiconductor absorber layer, as can the wet deposited dielectric layer.

A non-exhaustive list of materials that the dry deposited $n_h$ dielectric and/or wet deposited $n_h$ outer proactive layers can be made from are shown is shown in Table 1 below.

TABLE 1

| Refractive Index Materials (visible region) | | Refractive Index Materials (visible region) | |
|---|---|---|---|
| Material | Refractive Index | Material | Refractive Index |
| Germanium (Ge) | 4.0-5.0 | Chromium (Cr) | 3.0 |
| Tellurium (Te) | 4.6 | Tin Sulfide (SnS) | 2.6 |
| Gallium Antimonite (GaSb) | 4.5-5.0 | Low Porous Si | 2.56 |
| Indium Arsenide (InAs) | 4.0 | Chalcogenide glass | 2.6 |
| Silicon (Si) | 3.7 | Cerium Oxide ($CeO_2$) | 2.53 |
| Indium Phosphate (InP) | 3.5 | Tungsten (W) | 2.5 |
| Gallium Arsenate (GaAs) | 3.53 | Gallium Nitride (GaN) | 2.5 |
| Gallium Phosphate (GaP) | 3.31 | Manganese (Mn) | 2.5 |
| Vanadium (V) | 3 | Niobium Oxide ($Nb_2O_3$) | 2.4 |
| Arsenic Selenide ($As_2Se_3$) | 2.8 | Zinc Telluride (ZnTe) | 3.0 |
| $CuAlSe_2$ | 2.75 | Chalcogenide glass + Ag | 3.0 |
| Zinc Selenide (ZnSe) | 2.5-2.6 | Zinc Sulfide (ZnS) | 2.5-3.0 |
| Titanium Dioxide ($TiO_2$) - solgel | 2.36 | Titanium Dioxide ($TiO_2$) - vacuum deposited | 2.43 |
| SnO2 | 2.0 | Hafnium Oxide ($HfO_2$) | 2.0 |
| Zinc Sulfide (ZnS) | 2.3 + i(0.015) | Niobium Oxide ($Nb_2O_5$) | 2.1 |
| Titanium Nitride (TiN) | 1.5 + i(2.0) | Aluminum (Al) | 2.0 + i(15) |
| Chromium (Cr) | 2.5 + i(2.5) | Silicon Nitride (SiN) | 2.1 |
| Niobium Pentoxide(Nb2O5) | 2.4 | Zirconium Oxide (ZrO2) | 2.36 |
| Hafnium Oxide (HfO2) | 1.9-2.0 | | |

The above examples and aspects are for illustrative purposes only and changes, modifications, and the like will be apparent to those skilled in the art and yet still fall within the scope of the invention. As such, the scope of the invention is defined by the claims and all equivalents thereof.

I claim:

1. An omnidirectional high chroma red structural color comprising:
   a multilayer stack having:
      a reflective core layer;
      a semiconductor absorber layer extending across said reflective core layer;
      a dielectric absorber layer extending across said semiconductor absorber layer; and
      a high index of refraction dielectric layer extending across said dielectric absorber layer, said high index of refraction dielectric layer having a thickness D that obeys the relation 0.1 QW<D≤4 QW where QW is a quarter wave thickness for a target wavelength, said target wavelength having a predefined hue between 0-40° on an a*b* Lab color map;
   said multilayer stack reflecting a single band of visible light with said predefined hue between 0-40° on said a*b* Lab color map, said single band of visible light having a hue shift within said predefined hue between 0-40° on said a*b* Lab color map when viewed from all angles between 0-45° normal to an outer surface of said multilayer stack.

2. The omnidirectional high chroma red structural color of claim 1, wherein said hue is between 10-30° and said hue shift is within said 10-30° on said a*b* Lab color map.

3. The omnidirectional high chroma red structural color of claim 1, wherein said reflective core layer has a thickness between 50-200 nanometers, inclusive.

4. The omnidirectional high chroma red structural color of claim 3, wherein said reflective core layer is made from a reflective metal selected from the group consisting of Al, Ag, Pt, Sn and combinations thereof.

5. The omnidirectional high chroma red structural color of claim 3, wherein said reflective core layer is made from a colorful metal selected from the group consisting of Au, Cu, brass, bronze and combinations thereof.

6. The omnidirectional high chroma red structural color of claim 1, wherein said semiconductor absorber layer has a thickness between 5-500 nanometers, inclusive.

7. The omnidirectional high chroma red structural color of claim 6, wherein said semiconductor absorber layer is made from the group consisting of amorphous Si, Ge and combinations thereof.

8. The omnidirectional high chroma red structural color of claim 1, wherein said dielectric absorber layer has a thickness between 5-500 nanometers, inclusive.

9. The omnidirectional high chroma red structural color of claim 8, wherein said dielectric absorber layer is made from $Fe_2O_3$.

10. The omnidirectional high chroma red structural color of claim 1, wherein said high index of refraction dielectric layer is made from a dielectric material selected from the group consisting of ZnS, $TiO_2$, $HfO_2$, $Nb_2O_5$, $Ta_2O_5$ and combinations thereof.

11. The omnidirectional high chroma red structural color of claim 1, wherein said reflective core layer is a central reflective core layer and said semiconductor absorber layer is a pair of semiconductor absorber layers extending across opposite sides of said central reflective core layer, said central reflective core layer sandwiched between said pair of semiconductor absorber layers.

12. The omnidirectional high chroma red structural color of claim 11, wherein said dielectric absorber layer is a pair of dielectric absorber layers, said central reflective core layer and said pair of semiconductor absorber layers sandwiched between said pair of high dielectric absorber layers.

13. The omnidirectional high chroma red structural color of claim 1, wherein said high index of refraction dielectric layer is a pair of high index of refraction dielectric layers, said central reflective core layer and said pair of semiconductor absorber layers and said pair of dielectric absorber layers sandwiched between said pair of high dielectric absorber layers.

14. A process for making an omnidirectional high chroma red structural color, the process comprising:
   manufacturing a multilayer stack by:
      dry depositing a reflective core layer;
      dry depositing a semiconductor absorber layer that extends across the reflective core layer;
      dry or wet depositing a dielectric absorber layer that extends across the semiconductor absorber layer; and
      dry or wet depositing a high index of refraction dielectric layer that extends across the dielectric absorber layer, the high index of refraction dielectric layer having a thickness D that obeys the relation $0.1\ QW < D \leq 4\ QW$ where QW is a quarter wave thickness for a target wavelength having a predefined hue between 0-40° on an a*b* Lab color map;
   the multilayer stack reflecting visible light with the predefined hue between 0-40° on the a*b* Lab color map and having a hue shift within the predefined hue between 0-40° on the a*b* Lab color map when viewed from all angles between 0-45° normal to an outer surface of the multilayer stack.

15. The process of claim 14, wherein the reflective core layer has a thickness between 50-200 nanometers, inclusive.

16. The process of claim 15, wherein said reflective core layer is made from a reflective metal selected from the group consisting of Al, Ag, Pt, Sn and combinations thereof.

17. The process of claim 15, wherein the reflective core layer is made from a colorful metal selected from the group consisting of Au, Cu, brass, bronze and combinations thereof.

18. The process of claim 14, wherein the semiconductor absorber layer has a thickness between 5-500 nanometers, inclusive, and is made from the group consisting of amorphous Si, Ge and combinations thereof.

19. The process of claim 14, wherein the dielectric absorber layer has a thickness between 5-500 nanometers, inclusive, and is made from $Fe_2O_3$.

* * * * *

UNITED STATES PATENT AND TRADEMARK OFFICE
CERTIFICATE OF CORRECTION

PATENT NO.         : 9,664,832 B2                                    Page 1 of 1
APPLICATION NO.    : 14/793123
DATED              : May 30, 2017
INVENTOR(S)        : Debasish Banerjee It is certified that error appears in the above-identified patent and that said Letters Patent is hereby corrected as shown below:

In the Specification

In Column 6, Line 66, in Equation 8, delete "$q_s$" insert --q-- therefor.
In Column 7, Line 59, after "thickness" insert --'d'-- therefor.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*